US011449823B2

(12) United States Patent
Endo et al.

(10) Patent No.: US 11,449,823 B2
(45) Date of Patent: Sep. 20, 2022

(54) INFORMATION PROCESSING SYSTEM, INFORMATION PROCESSING METHOD, INFORMATION PROCESSING PROGRAM

(71) Applicant: TOYOTA JIDOSHA KABUSHIKI KAISHA, Toyota (JP)

(72) Inventors: Masato Endo, Nagakute (JP); Yuichiro Haruna, Oyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 347 days.

(21) Appl. No.: 16/226,515

(22) Filed: Dec. 19, 2018

(65) Prior Publication Data

US 2019/0197471 A1 Jun. 27, 2019

(30) Foreign Application Priority Data

Dec. 27, 2017 (JP) .............................. JP2017-252620

(51) Int. Cl.
*G06Q 10/08* (2012.01)
*G06F 9/54* (2006.01)
*H04L 9/08* (2006.01)

(52) U.S. Cl.
CPC ......... *G06Q 10/0833* (2013.01); *G06F 9/541* (2013.01); *G06Q 10/0835* (2013.01); *H04L 9/0819* (2013.01)

(58) Field of Classification Search
CPC .............................. G06F 9/541; H04L 9/0819
USPC ....................................................... 705/333
See application file for complete search history.

(56) References Cited

U.S. PATENT DOCUMENTS

| | | | |
|---|---|---|---|
| 2005/0114221 A1* | 5/2005 | Walters | G06Q 10/0837 705/340 |
| 2015/0100514 A1* | 4/2015 | Parris | G06Q 10/083 705/340 |
| 2016/0096508 A1* | 4/2016 | Oz | H04W 4/023 701/36 |
| 2016/0099927 A1* | 4/2016 | Oz | G07C 5/0808 726/9 |
| 2018/0240067 A1* | 8/2018 | Oz | H04W 12/08 |
| 2019/0311327 A1* | 10/2019 | Habbaba | H04W 4/44 |
| 2020/0090117 A1* | 3/2020 | Luo | G06Q 10/083 |

FOREIGN PATENT DOCUMENTS

| | | |
|---|---|---|
| JP | S62138963 A | 6/1987 |
| JP | H03286254 A | 12/1991 |
| JP | 2006-206225 A | 8/2006 |
| JP | 2006-206226 A | 8/2006 |
| JP | 2015-045141 A | 3/2015 |
| WO | 2017035052 A1 | 3/2017 |

OTHER PUBLICATIONS

Freightquote.com, "What is consolidated shipping and why is it important?", Available at: https://www.freightquote.com/blog/what-is-consolidated-shipping-and-why-is-it-important/, last accessed May 13, 2022 (Aug. 11, 2017) (Year: 2017).*

* cited by examiner

*Primary Examiner* — Emmett K. Walsh
(74) *Attorney, Agent, or Firm* — Hunton Andrews Kurth LLP

(57) ABSTRACT

An information processing system includes a pickup source determiner configured to determine an interior of a vehicle, a building, or a facility used by a user of a predetermined pickup service, as a pickup source of a package in response to a request for picking up the package from a user terminal of the pickup service.

8 Claims, 8 Drawing Sheets

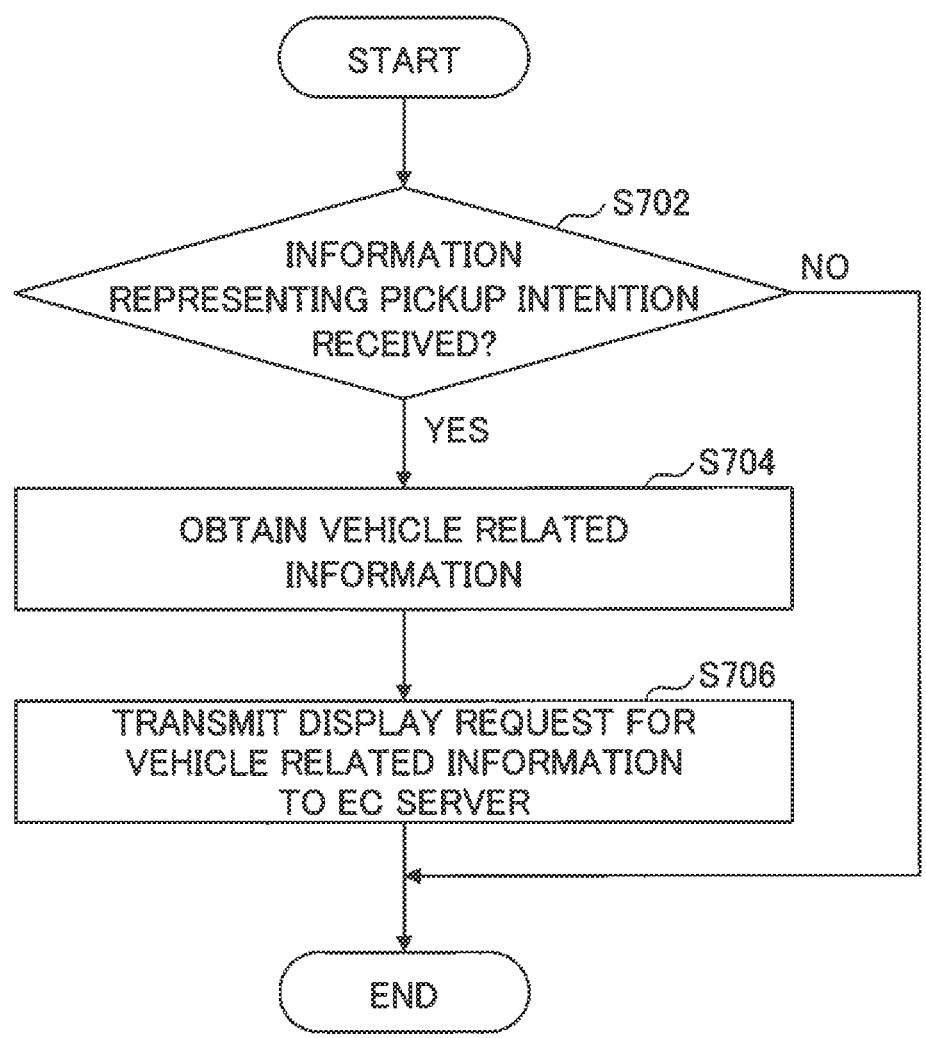

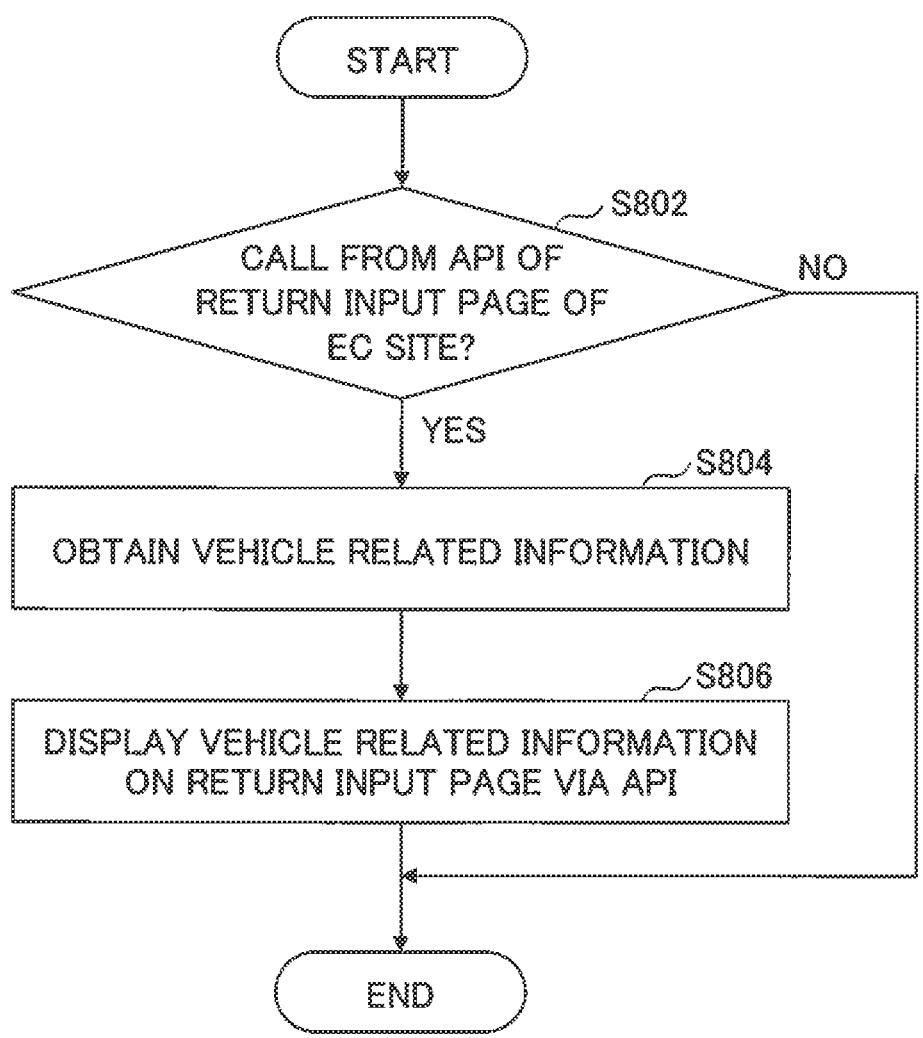

INFORMATION PROCESSING SYSTEM, INFORMATION PROCESSING METHOD, INFORMATION PROCESSING PROGRAM

CROSS-REFERENCE TO RELATED APPLICATIONS

This application is based on and claims priority to Japanese patent application No. 2017-252620 filed on Dec. 27, 2017, the entire contents of which are hereby incorporated by reference.

FIELD

The present disclosure relates to an information processing system and the like.

BACKGROUND

For example, a delivery mechanism has been disclosed that uses the interior of a vehicle such as a trunk as a delivery destination of a package (see, e.g., Japanese Unexamined Patent Publication No. 2006-206226).

Specifically, authentication information (key information) for unlocking the vehicle is delivered to a delivery company (e.g., to a mobile terminal carried by a delivery worker). Then, when a predetermined transmission signal including key information is transmitted to the vehicle from the mobile terminal carried by the delivery worker, and authentication based on the key information included in the transmission signal succeeds on the vehicle side, a door to access the trunk of the vehicle (e.g., a trunk lid or a back door) is unlocked. This enables the delivery worker to deposit the package in the trunk. Thus, the delivery company can provide a delivery service in which the interior of the vehicle such as the trunk of the vehicle can be specified as a delivery destination (referred to as "vehicle interior delivery service", below) to clients.

Similarly, for example, it is also possible to provide a delivery service in which the interior of a lockable/unlockable building or facility used by a user, such as a home or a second house, can be specified as a delivery destination even if the user is absent.

However, in the conventional technology mentioned above or the like, it is not considered that the user uses the interior of a vehicle, a building, or a facility (referred to as a "vehicle or the like" for the sake of convenience, below) as a pickup source of a package. Therefore, for example, when the user is absent, it is not possible for the user to designate the interior of the vehicle or the like used by himself/herself as the pickup source of a package; after all, the user may need to visit a business office of a delivery company or the like in order to hand over the package to the delivery company or the like.

In view of the above problem, it is an object of the present disclosure to provide an information processing system or the like that can establish a pickup service in which the interior of a vehicle or the like used by a user can be used as a pickup source of a package.

SUMMARY

In order to achieve the above object, according to an embodiment in the present disclosure, an information processing system is provided that includes a pickup source determiner configured to determine an interior of a vehicle, a building, or a facility used by a user of a predetermined pickup service, as a pickup source of a package in response to a request for picking up the package from a user terminal of the pickup service.

According to this embodiment, the information processing system allows the user to use and designate the interior of the vehicle or the like as the pickup source through the user terminal (e.g., a terminal directly operated by the user or a terminal for requesting pickup at a business office which the user visits). Therefore, the information processing system can establish a pickup service that can use the interior of the vehicle or the like used by the user as a pickup source.

Also, in the embodiment described above, the pickup source determiner may determine an interior of a vehicle, a building, or a facility designated from among a plurality of vehicles, buildings, or facilities used by the user, as the pickup source of each of a plurality of items constituting the package, in response to the request for picking up the package from the user terminal.

According to this embodiment, the information processing system allows the user to use and designate the respective interiors of the multiple vehicles or the like used by the user as the pickup sources in the case where multiple items constitute the package of one pickup request. Therefore, for example, when the user desires to make a request for picking up multiple items constituting the package, the user can designate the interiors of the multiple vehicles parked in the same place and the interiors of adjacent buildings and facilities, which are used by himself/herself, as the pickup sources. Therefore, the information processing system can further improve the convenience of the user.

Also, in the embodiment described above, the information processing system may further include a controller configured to transmit to the user terminal information on the vehicle, the building, or the facility for the user to designate the interior of the vehicle, the building, or the facility as the pickup source of the package, in a case where information representing that the user intends to make the request for picking up the package has been received from an external device operating a website related to the pickup service, through the website or an application program installed in the user terminal interoperating with the website; here, the pickup source determiner determines the interior of the vehicle, the building, or the facility as the pickup source of the package in a case where the interior of the vehicle, the building, or the facility has been designated as the pickup source of the package, in response to an operation on the user terminal displaying the information on the vehicle, the building, or the facility on the website or on a window.

According to this embodiment, the information processing system can cause a website accessed from the user terminal to display information on vehicles and the like, one of which can be designated as the pickup source, so as to specifically determine a vehicle designated on the website as the pickup source in response to an operation on the user terminal. The information processing system can also cause a window of an application program installed in the user terminal interoperating with the website to display information on vehicles and the like, one of which can be designated as the pickup source, so as to determine a vehicle designated as the pickup source similarly. Therefore, the information processing system can specifically establish a pickup service that can use the interior of the vehicle or the like used by the user as a pickup source, for a package requested to be picked up through a predetermined website or an application corresponding to the website.

Also, in the embodiment described above, the website may be a predetermined electronic commerce site, and the controller may transmit to the user terminal the information on the vehicle, the building, or the facility for the user to designate the interior of the vehicle, the building, or the facility as the pickup source of an item to be returned, in a case where information representing the user's intention to return the item has been received through the electronic commerce site or the application program.

According to this embodiment, the information processing system can specifically establish a pickup service that can use the interior of the vehicle or the like used by the user as a pickup source, for an item that is requested to be returned through an electronic commerce site (may be referred to as an "EC site", below). Similarly, the information processing system can specifically establish a pickup service that can use the interior of the vehicle or the like used by the user as a pickup source, for an item that is requested to be returned through an application installed in the user terminal interoperating with an EC application (may be referred to as an "EC application", below).

Also, in the embodiment described above, in the case where the information representing the user's intention to return the item has been received from the external device through the website or the application program, the controller may cause the predetermined web page of the website or a predetermined window of the application program corresponding to the web page displayed on the user terminal, to display the information on the vehicle, the building, or the facility.

According to this embodiment, the information processing system can control information on a vehicle and the like used by the user to be displayed on a web page of an EC site, a window of an EC application, or the like.

Also, in the embodiment described above, the controller may cause the web page or the window displayed on the user terminal to display the information on the vehicle, the building, or the facility, without having the information go through the external device.

According to this embodiment, the information processing system does not need to transmit the information on the vehicle and the like, in order to cause a web page of an EC site or a window of an EC application to display the vehicle-related information. Therefore, the information processing system can establish a mechanism of a pickup service that takes privacy of the user into consideration, as the vehicle-related information may include information on the privacy of the users, such as the positional information on the vehicle or the like, the use state of the vehicle by the other users, and the like.

Also, in the embodiment described above, the controller may cause the web page or the window to display the information on the vehicle, the building, or the facility, through a predetermined API embedded in the web page or the window for the user to designate or input information on the request for picking up the package.

According to this embodiment, when a web page or the like for designating required information on a pickup request is displayed on the user terminal, the information processing system can cause the web page to display the vehicle-related information on the vehicle or the like, through the predetermined API embedded in the web page. Therefore, the information processing system can specifically cause the web page to display the vehicle-related information on the vehicle or the like, without transmitting the vehicle-related information to an external device operating an EC site or the like.

Also, in the above embodiment, the information processing system may include a key information deliverer configured to deliver key information used for unlocking a door to access the interior of the vehicle, the building, or the facility corresponding to the pickup source determined by the pickup source determiner, to a company that provides the pickup service.

According to this embodiment, the information processing system allows the company that provides the pickup service to obtain the key information for unlocking the door to access the interior of the vehicle or the like used by the user, which has been determined as the pickup source. Therefore, the information processing system can specifically allow the company to unlock the door to access the interior of the vehicle or the like used by the user, which is determined as the pickup source, and to pick up the package.

Yet another embodiment may be implemented as an information processing method or an information processing program.

According to the embodiment described above, it is possible to provide an information processing system or the like that can establish a pickup service capable of using the interior of a vehicle or the like used by a user as a pickup source of a package.

BRIEF DESCRIPTION OF DRAWINGS

FIG. 7 is a flowchart schematically illustrating an example of a process of providing vehicle-related information performed by a center server; and FIG. 8 is a flowchart schematically illustrating another example of a process of providing vehicle-related information performed by a center server.

DESCRIPTION OF EMBODIMENTS

In the following, embodiments will be described with reference to the drawings.

[Overall Configuration of Authentication Key Management System]

Figure 1:
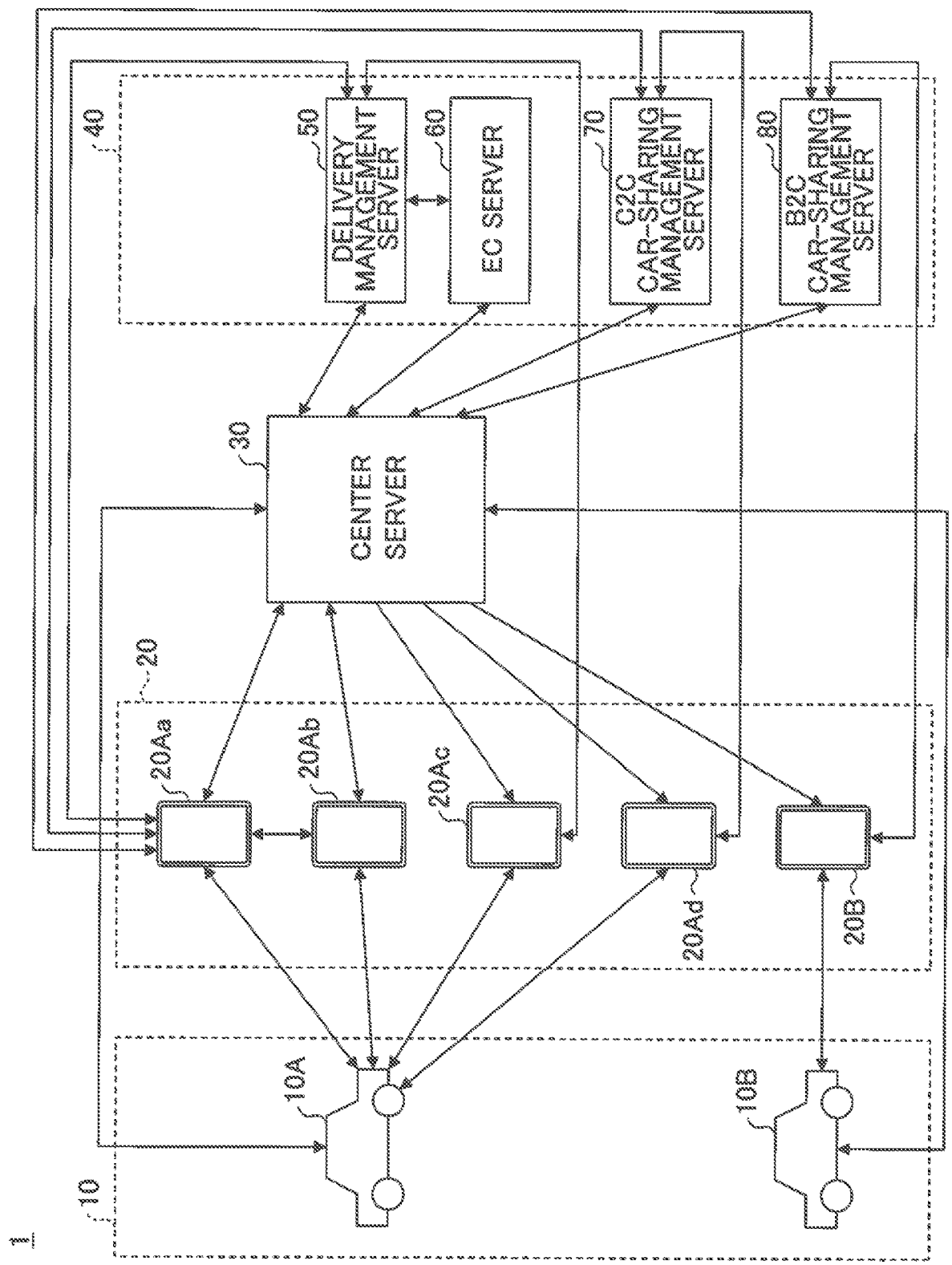
FIG. 1 is a diagram illustrating an example of an overall configuration of an authentication key management system.

FIG. 1 is a diagram illustrating an example of an overall configuration of an authentication key management system 1 according to an embodiment.

The authentication key management system 1 includes vehicles 10, mobile terminals 20, a center server 30, and service management servers 40.

Based on a predetermined communication standard, the vehicle 10 can perform wireless communication (referred to as "near-field communication", below) with the mobile terminal 20 at a relatively short distance (a distance that allows communication between the interior of the vehicle and the outside of the vehicle). The vehicle 10 is a target of activation (turning on the ignition) and locking/unlocking the doors, based on transmission signals (authentication request, lock request, and unlock request as will be described later) from the mobile terminal 20. The doors of the vehicle 10 may include not only a door for getting on and off, but also a door for accessing a package in a trunk (a luggage room), for example, a trunk lid or a back door. Turning on the ignition (IG-ON) of the vehicle 10 includes a start-up of an engine if the vehicle 10 uses the engine as the main power source, and a power-on of an electric motor if the vehicle 10 uses the electric motor as the main power source. In the following, the embodiment will be described assuming that the vehicle 10 uses an engine 117 (which will be described later) as the main power source; an activation of the vehicle 10 (IG-ON) corresponds to a start-up of the engine 117, and a stop of the vehicle 10 (IG-OFF) corresponds to a stop of the engine 117.

Also, the vehicle 10 is communicably connected with the center server 30 through a predetermined communication network (e.g., a cellular phone network having a number of base stations as endpoints and/or the Internet). As will be described later, the vehicle 10 transmits vehicle information such as positional information to the center server 30.

The vehicles 10 include a vehicle 10A owned by an individual and a vehicle 10B owned by a provider of B2C (business-to-consumer (B2C) car-sharing service.

The mobile terminal 20 is communicably connected with the center server 30 through a predetermined communication network (e.g., a cellular phone network having a number of base stations as endpoints and/or the Internet). The mobile terminal 20 obtains authentication key information (an example of key information, referred to as "authentication key", below) delivered from the center server 30, and transmits the obtained authentication key to the vehicle 10 by comparatively short-distance wireless communication in response to a predetermined operation performed by the user, to be capable of unlocking and locking the vehicle 10. The mobile terminal 20 may be, for example, a general-purpose mobile phone, a smartphone, or a tablet terminal, and may activate a predetermined application program (referred to as a "key application", below) installed in a built-in processor 23 to implement the functions described above, as will be described later. Alternatively, the mobile terminal 20 may be a portable dedicated terminal specialized in unlocking the door of the vehicle 10 and activating the vehicle 10, by obtaining an authentication key from the center server 30, and using the obtained authentication key. The mobile terminals 20 include mobile terminals 20Aa to 20Ad corresponding to the vehicle 10A, and a mobile terminal 20B corresponding to the vehicle 10B.

The mobile terminal 20Aa is a mobile terminal 20 carried by the owner (owner user) among users who regularly use the vehicle 10A (referred to as "regular users", below). Also, the mobile terminal 20Aa may be capable of bidirectionally communicating with the mobile terminal 20Ab by wireless communication within a comparatively short distance.

The mobile terminal 20Ab is a mobile terminal 20 carried by a regular user other than the owner user of the vehicle 10A, including, for example, a family member of the owner user or a close friend of the owner user (referred to as a "child user", below).

Note that the child user may be a user who does not or cannot drive the vehicle 10A (e.g., a child of the owner user under 18 years old, etc.). This is because, for example, in the case of using only a trunk delivery service, which will be described later, the regular user does not need to drive the vehicle 10A.

The mobile terminal 20Ac is a mobile terminal 20 carried by a worker who performs a delivery operation of a package to a delivery destination, or a pickup operation of a package from a pickup source, which will be described later, where the operations relate to a company that provides the trunk delivery service and the trunk pickup service (simply referred to as a "delivery company", below). In the following, a worker who performs a delivery operation may be referred to as a "delivery worker", and a worker who performs a pickup operation is may be referred to as a "pickup worker", to distinguish the workers. The mobile terminal 20Ac is communicably connected with the center server 30 and a delivery management server 50, which will be described later, through a predetermined communication network (e.g., a cellular phone network having a number of base stations as endpoints and/or the Internet).

The mobile terminal 20Ad is a mobile terminal 20 carried by a borrower of the vehicle 10A in a C2C (Consumer to Consumer) car-sharing service, which will be described later. The mobile terminal 20Ad is communicably connected with the center server 30 and a C2C car-sharing management server 70, which will be described later, through a predetermined communication network (e.g., a cellular phone network having a number of base stations as endpoints and/or the Internet).

The mobile terminal 20B is a mobile terminal 20 carried by a borrower of the vehicle 10B in a B2C car-sharing service, which will be described later. The mobile terminal 20B is communicably connected with the center server 30 and a B2C car-sharing management server 80, which will be described later, through a predetermined communication network (e.g., a cellular phone network having a number of base stations as endpoints and/or the Internet).

The center server 30 is communicably connected with the vehicles 10, the mobile terminals 20, and the service management servers 40.

The center server 30 manages issuance of an authentication key of the vehicle 10. For example, the center server 30 issues an authentication key in accordance with a predetermined condition, and delivers the key to the mobile terminal 20.

Also, the center server 30 obtains the positional information from the vehicle 10. This enables the center server 30 to follow the position of the vehicle 10.

Also, the center server 30 operates a car-sharing service to share the vehicle 10A among multiple regular users including the owner user of the vehicle 10A. Specifically, the center server 30 operates a sharing service to share an authentication key (key-sharing service) in which each of the multiple pre-registered regular users including the owner user can obtain an authentication key of the vehicle 10A to the mobile terminals 20 (mobile terminals 20Aa and 20Ab) of the user.

Also, the center server 30 performs a registration process (use registration process) for a regular user of the vehicle 10A to use services (key-sharing service, trunk delivery service, C2C car-sharing service, etc.) that use the vehicle 10A. Specifically, in order for a regular user of the vehicle 10A to use a service that uses the vehicle 10A, the center server 30 registers permission for delivering an authentication key to a predetermined mobile terminal 20 (referred to as "permission for authentication key arrangement", below) in response to an authentication key arrangement request transmitted by a key-sharing manager 3207 or the service management servers 40, which will be described later.

Also, the center server 30 manages the use state of the vehicle 10A across multiple services (i.e., multiple companies) including a trunk delivery service and a C2C car-sharing service, which will be described later.

The service management servers 40 operate and manage various services provided by using the vehicle 10. The service management servers 40 include the delivery management server 50 and an EC server 60 corresponding to the trunk delivery service and the trunk pickup service, the C2C car-sharing management server 70 corresponding to the C2C car-sharing service, and the B2C car-sharing management server 80 corresponding to the B2C car-sharing service.

Note that the trunk delivery service includes a trunk delivery service for delivering an item ordered (purchased) on an EC site, which will be described later, and a trunk delivery service for delivering a package other than items ordered on an EC site. The latter trunk delivery service includes, for example, a delivery service in which a regular user of the vehicle 10A can designate the vehicle 10A parked in his/her home, a workplace, or the like as the delivery destination in the case of the regular user desiring delivery of a package addressed to himself/herself from a travel destination or a business trip destination to his/her home, the workplace, or the like. The latter trunk delivery service also includes, for example, a delivery service in which a regular user of the vehicle 10A can change the delivery destination to the trunk of the vehicle 10A in the case where a notice has been transmitted from the delivery management server 50 to the regular user through e-mail, a predetermined SNS (Social Networking Service) account, or a specific application activated on a terminal such as the mobile terminal 20Aa or 20Ab, which informs that a package addressed to the regular user is going be delivered to his/her home. In the following, although the former trunk delivery service will be mainly described in the embodiment, specific contents and operations of various elements related to the trunk delivery service, which will be described later, can be applied to the corresponding contents and operations of elements in the latter trunk delivery service. Also, the trunk pickup service includes a trunk pickup service for picking up an item to be returned to an EC site or the like, which will be described later, and a pickup service for picking up a package other than items returned to an EC site or the like. The latter trunk pickup service includes, for example, a pickup service in which a regular user of the vehicle 10A can have a package in the trunk of the vehicle 10A picked up by a delivery company in a situation where the regular user is absent yet desires to transmit the package. In the following, although the former trunk pickup service will be mainly described in the embodiment, specific contents and operations of various elements related to the trunk pickup service, which will be described later, can be applied to the corresponding contents and operations of elements in the latter trunk pickup service.

The delivery management server 50 is communicably connected with the mobile terminal 20Ac and the center server 30 through a predetermined communication network, to operate and manage a delivery system related to the trunk delivery service and the trunk pickup service that include receipt of a package and delivery of the package to/from a trunk of the vehicle 10A. In the following, the trunk delivery service and the trunk pickup service provided by a delivery company corresponding to the delivery management server 50 may be collectively referred to as a "trunk delivery service or the like" in some cases.

Note that a delivery company operating the delivery management server 50 may provide a delivery service to a regular user of the vehicle 10A in which, instead of or in addition to the trunk of the vehicle 10A, the user can designate a vehicle interior other than the trunk of the vehicle 10A (e.g., an occupant space) as the delivery destination. Similarly, the delivery company may provide a pickup service to a regular user of the vehicle 10A in which, instead of or in addition to the trunk of the vehicle 10A, the user can designate a vehicle interior other than the trunk of the vehicle 10A as the pickup source. In the following, delivery services in which the inside of the vehicle 10A including the trunk (i.e., the interior of the vehicle 10A) can be designated as the delivery destination and the pickup source are referred to as a "vehicle interior delivery service" and a "vehicle interior pickup service", respectively. Also, a vehicle interior pickup service and a vehicle interior delivery service may be realized by a company that provides a service in a form of temporarily keeping an article (e.g., a laundry service company of clothing) as the pickup service when receiving an article from a regular user of the vehicle 10A, and the delivery service when delivering the finished article to the regular user. Also, a vehicle interior pickup service may be realized by a company that provides a service in a form of collecting an article from a client (e.g., a scrap collector or an antique purchaser) as the pickup service when collecting an article from a regular user of the vehicle 10A. In these cases, a management server may be provided by the laundry service company, the scrap collector or the like to operate and manage the vehicle interior delivery service and the vehicle interior pickup service, which may be included in the service management servers 40 as is the delivery management server 50. In other words, instead of or in addition to the delivery management server 50, such a management server may be provided.

The EC server 60 is communicably connected with the center server 30 and the delivery management server 50 through a predetermined communication network, to operate a predetermined website (EC site) for selling items and services.

For example, for regular users of the vehicle 10A registered in advance and a predetermined delivery company (in the embodiment, a delivery company corresponding to the delivery management server 50) as target users, the EC server 60 causes a user terminal directly operated by the user (e.g., a mobile terminal 20Aa or 20Ab, etc., referred to as a "user terminal", below) to display the trunk of the vehicle 10A on a web page or the like for inputting information on an order of an item on an EC site (referred to as an "order input page", below) accessed through a browser activated on the user terminal, as a choice of delivery destinations. This enables a regular user of the vehicle 10A to have a purchased (ordered) item delivered to the trunk of the vehicle 10A, which may be parked in a parking lot close to his/her home, or may be used for commuting and parked in a parking lot of the working place, for example, during his/her absence from home.

Also, for example, the EC server 60 causes a user terminal to display the trunk of the vehicle 10A used by the user on a web page or the like for performing a return procedure of an item purchased on an EC site (referred to as a "return input page", below) accessed through a browser activated on the user terminal, as a choice of pickup sources. This enables a regular user of the vehicle 10A to have a return item picked up from the trunk of the vehicle 10A, which may be parked in a parking lot close to his/her home, or may be used for commuting and parked in a parking lot of the working place, for example, during his/her absence from home.

The C2C car-sharing management server 70 is communicably connected with the mobile terminal 20Ad and the center server 30, to operate and manage a C2C car-sharing service that supports individuals in lending and borrowing the vehicle 10A. For example, the C2C car-sharing management server 70 operates and manages the C2C car-sharing service by receiving a registration of date and time when the owner user can lend the vehicle 10A; receiving a use reservation from a person who desires to borrow the vehicle 10A; issuing an authentication key of the vehicle 10A; and the like. Also, the C2C car-sharing management server 70 may operate and manage a C2C trunk-sharing service in a form of lending the interior or the trunk of the vehicle 10A owned by an individual as a place to temporarily leave a package, a package delivery destination, or the like.

The B2C car-sharing management server 80 is communicably connected with the mobile terminal 20B and the center server 30, to operate and manage a B2C car-sharing service that lends the vehicle(s) 10B owned by a predetermined company (e.g., a provider of the B2C car-sharing service) to multiple general consumers in a sharable way. For example, the B2C car-sharing management server 80 operates and manages the B2C car-sharing by receiving a use reservation of the vehicle 10B; arranging a parking position of the vehicle 10B; and issuing an authentication key of the vehicle 10B; and the like. Also, the B2C car-sharing management server 80 may operate and manage a B2C trunk sharing service in a form of lending the interior or the trunk of the vehicle 10B as a place to temporarily leave a package, a package delivery destination, or the like.

Instead of or in addition to the B2C car-sharing management server 80, the service management servers 40 may include a company car use management server to operate a car-sharing service (company car use management service) in which a vehicle 10 being a company car of a company is a subject of use reservation, and an employee of the company is a borrower. In this case, if there is an idle time of the vehicle 10 being the company car, the C2C car-sharing management server 70 may operate a C2C car-sharing service in which the vehicle 10 as a company car is a subject of borrowing. Also, the delivery management server 50 and the EC server 60 may operate a trunk delivery service in which the trunk of a vehicle 10 as a company car of a company can be designated as a delivery destination of a package to be delivered to the company.

[Details of Configuration Related to Locking/Unlocking and Activation of Vehicle]

Next, with reference to FIG. 2, a configuration related to locking/unlocking and activation of the vehicle 10 in the authentication key management system 1 will be described.

Figure 2:
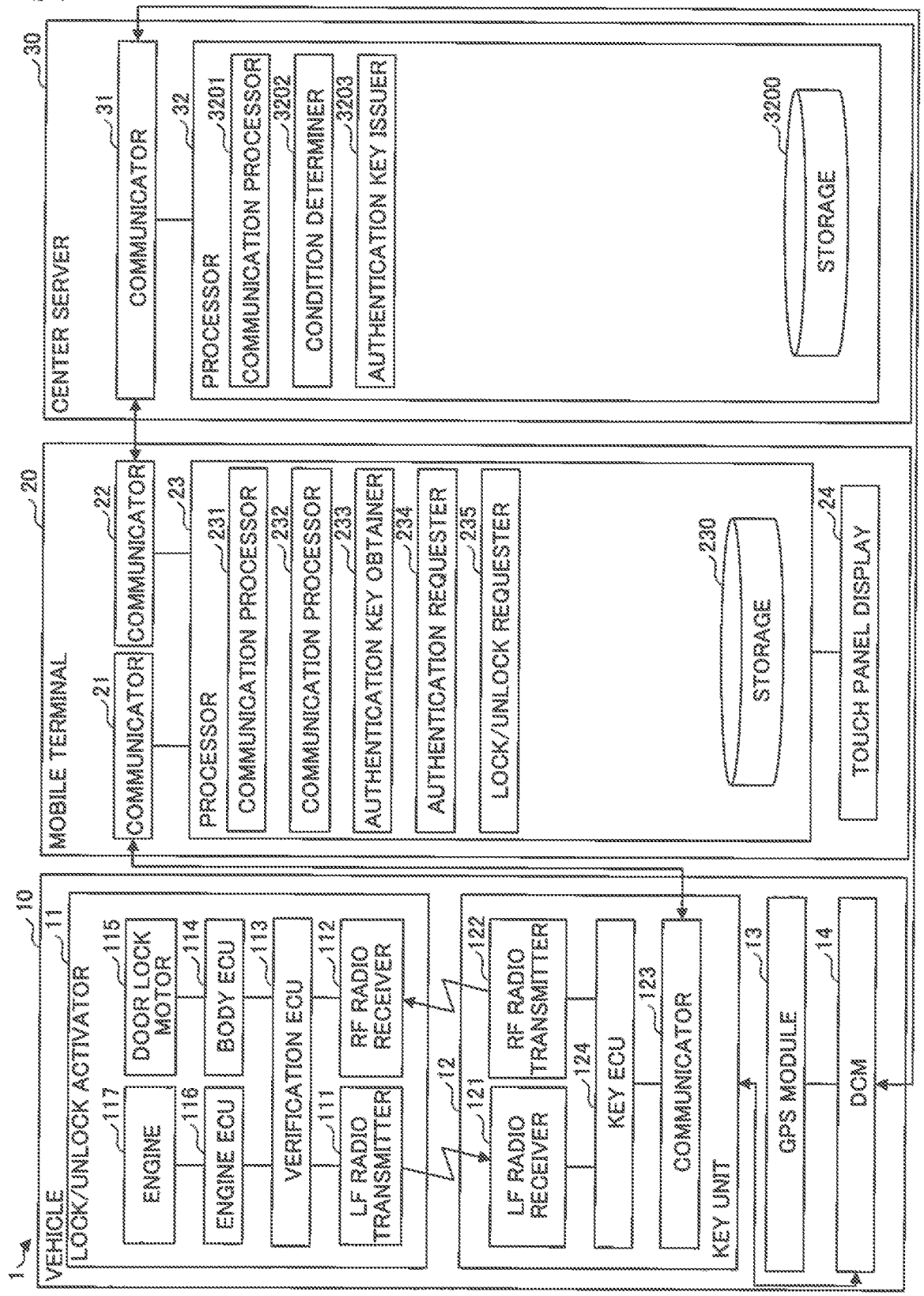
FIG. 2 is a diagram mainly illustrating an example of a configuration related to locking/unlocking a vehicle in an authentication key management system.

FIG. 2 is a diagram mainly illustrating an example of a configuration related to locking/unlocking and activation of the vehicle 10 in the authentication key management system 1. The vehicle 10 includes a lock/unlock activator 11, a key unit 12, a GPS module 13, and a DCM (Data Communication Module) 14.

The lock/unlock activator 11 is attached to the vehicle 10, to lock and unlock a door of the vehicle 10 in response to a lock signal and an unlock signal transmitted from the key unit 12 as a radio wave in an RF (Radio Frequency) band (e.g., 300 MHz to 3 GHz) (referred to as "RF radio wave", below). Also, the lock/unlock activator 11 activates the vehicle 10, triggered by a pressing operation on an activation switch (not illustrated) provided in the interior of the vehicle 10, and depending on an exchange with the key unit in a radio wave in an LF (Low Frequency) band (e.g., 30 Hz to 300 kHz) (referred to as "LF radio wave", below) and an RF wave. The lock/unlock activator 11 includes an LF radio wave transmitter 111, an RF radio wave receiver 112, a verification ECU (Electronic Control Unit) 113, a body ECU 114, a door lock motor 115, an engine ECU 116, and the engine 117 as the drive power source of the vehicle 10.

Note that the lock/unlock activator 11 operates on electric power supplied from an auxiliary battery (not illustrated) installed in the vehicle 10.

The LF radio wave transmitter 111 is built in, for example, the center console or the door handle in the vehicle interior, to transmit an LF radio wave under control of the verification ECU 113.

The RF wave receiver 112 is provided in, for example, a trim of a luggage room of the vehicle 10, to receive an RF electric wave under control of the verification ECU 113.

The verification ECU 113 is an electronic control unit that controls locking/unlocking the door of the vehicle 10 and activating the vehicle 10, based on an exchange of signals with the key unit 12. The verification ECU 113 may be implemented discretionarily by hardware, software, or a combination of these. The verification ECU 113 may be mainly constituted with, for example, a microcomputer that includes a CPU (Central Processing Unit), a RAM (Random Access Memory), a ROM (Read-Only Memory), an auxiliary storage device, an RTC (Real Time Clock), and a communication interface. Here, the verification ECU 113 implements various control processes by running various programs stored in the ROM and the auxiliary storage device on the CPU. In the following, the same applies to a key ECU 124, which will be described later.

The verification ECU 113 causes the RF radio wave receiver 112 to receive an unlock signal and a lock signal transmitted as RF radio waves from the key unit 12.

Also, in the case of receiving an unlock signal or a lock signal, the verification ECU 113 authenticates the transmission source of the unlock signal or the lock signal (key unit 12), based on key information included in the unlock signal or the lock signal (referred to as "internal key information", below). For example, if internal key information registered in advance in an internal memory such as the auxiliary storage device matches the internal key information included in the unlock signal or the lock signal match, the verification ECU 113 determines that the authentication has succeeded; or otherwise, determines that the authentication has failed.

Also, for example, the verification ECU 113 may perform a challenge and response authentication, by transmitting through the LF radio wave transmitter 111 an LF radio wave including a "challenge" created by a predetermined method using the internal key information in the internal memory, toward the key unit 12, and receiving through the receiver 112 a "response" returned from the key unit 12, on which the authentication can be based.

Then, if the authentication has succeeded, the verification ECU 113 transmits an unlock command (upon reception of an unlock signal) or a lock command (upon reception of a lock signal) to the body ECU 114 through an in-vehicle network such as a CAN (Controller Area Network).

Also, after having transmitted an unlock command or a lock command to the body ECU 114, if receiving a reply indicating that the door is normally unlocked or locked from the body ECU 114 through the in-vehicle network such as a CAN (an unlock reply or a lock reply), the verification ECU 113 transmits through the LF radio transmitter 111 a notice to the key unit 12 indicating that the door has been unlocked or locked (an unlock notice or a lock notice).

Note that, as will be described later, in an unlock signal, only some of the doors of the vehicle 10 may be designated as targets to be unlocked. In such a case, the verification ECU 113 specifies the doors to be unlocked in the unlock command. This causes the body ECU 114 to actuate only door lock motors 115 corresponding to the specified doors, and hence, enables to have only the specified doors unlocked.

Also, in the case where a press operation is performed on the activation switch described above, the verification ECU 113 authenticates the key unit 12 by exchanging signals with the key unit 12 through the LF radio wave transmitter 111 and the RF radio wave receiver 112.

For example, the verification ECU 113 transmits a request signal in the LF band requesting a reply of the internal key information, from the LF radio wave transmitter 111 to the key unit 12. When a response signal including the internal key information has been received from the key unit 12 by the RF wave receiver 112, the verification ECU 113 determines whether the authentication has succeeded or has failed based on a match between the internal key information registered in advance in the internal memory and the internal key information included in the response signal, as in the case of locking/unlocking the doors.

Also, for example, the verification ECU 113 may perform a challenge and response authentication as in the case of locking/unlocking the doors.

Then, if the authentication has succeeded, the verification ECU 113 transmits a start command of the engine 117 to the engine ECU 116 through the in-vehicle network such as a CAN.

The body ECU 114 is an electronic control unit to control operations of a door lock motor 115 that is communicably connected through a one-to-one communication line or the like. In response to an unlock command from the verification ECU 113, the body ECU 114 outputs a control command to cause the door lock motor 115 to perform an unlock operation. Also, in response to a lock command from the verification ECU 113, the body ECU 114 outputs a control command to cause the door lock motor 115 to perform a lock operation. Also, once the door has normally been unlocked or locked by the control command output to the door lock motor 115, the body ECU 114 transmits an unlock reply or a lock reply to the verification ECU 113 through the in-vehicle network such as a CAN.

The door lock motor 115 is a known electric actuator that unlocks and locks the door of the vehicle 10 in response to a control command from the body ECU 114.

The engine ECU 116 is an electronic control unit that drives and controls the engine 117. Specifically, the engine ECU 116 drives and controls various actuators such as a starter and an injector, which are installed in the engine 117. When a start command is input from the verification ECU 113, the engine ECU 116 outputs a control command to various actuators such as a starter and an injector of the engine 117, to start the engine 117.

The key unit 12 is placed in the interior of the vehicle 10, to transmit an unlock signal and a lock signal as RF waves to the lock/unlock activator 11 in response to an unlock request and a lock request, respectively, transmitted from the mobile terminal 20. Also, when a press operation is performed on the activation switch provided in the interior of the vehicle 10, the key unit 12 exchanges signals with the lock/unlock activator 11 in response to signals in the LF band transmitted from the lock/unlock activator 11. The key unit 12 includes an LF radio wave receiver 121, an RF radio wave transmitter 122, a communicator 123, and a key ECU 124.

The key unit 12 may be placed at a position that is difficult to visually recognize for a user seated on any of the seats of the vehicle 10 (e.g., the interior of a glove box or a center console box, etc.). Also, the key unit 12 may be fixed or may not be fixed to the vehicle 10. Also, the key unit 12 may be operated on a built-in button battery or the like, or may be operated on electric power supplied from an auxiliary battery installed in the vehicle 10.

The LF radio wave receiver 121 receives an LF radio wave under control of the key ECU 124.

The RF radio wave transmitter 122 transmits an RF radio wave under control of the key ECU 124.

The communicator 123 is a device to perform near-field communication with the mobile terminal 20 under control of the key ECU 124. The communicator 123 may be, for example, a BLE (Bluetooth (registered trademark) Low Energy) communication module to communicate with the mobile terminal 20 according to the BLE communication standard. Also, the following description assumes that the communication standard adopted by the communicator 123 is compliant with the BLE communication.

Note that the communicator 123 may be a communication device compliant with a short-range communication standard targeting a very short communicable distance, for example, an NFC (Near Field Communication) standard or the like. In this case, the communicator 123 may be built in a position close to the body surface of the vehicle 10 outside the vehicle interior (e.g., the inside of a door handle) or the like. This enables the key unit 12 (key ECU 124) to communicate with the mobile terminal 20 outside the vehicle interior even if the communicator 123 has a very short communicable distance.

The key ECU 124 is an electronic control unit to control transmitting a lock signal and an unlock signal to the lock/unlock activator 11 in response to an unlock request and a lock request, respectively, received from the mobile terminal 20.

The key ECU 124 controls the communicator 123 to establish a state in which communication with the mobile terminal 20 is enabled based on a predetermined communication standard, for example, the BLE communication standard.

Specifically, the key ECU 124 periodically (e.g., every several seconds) transmits an advertising packet including advertisement information reachable within a predetermined communication range (e.g., several meters to several tens of meters) from the communicator 123. The advertisement information includes a UUID (Universally Unique Identifier), a device ID (Identifier), and the like that correspond to the key unit 12. This enables the mobile terminal 20 to receive the advertising packet to confirm the advertisement information, so as to identify the key unit 12 installed in the target vehicle 10.

In response to receiving a connection request by BLE communication from the mobile terminal 20 located within the communication range of the vehicle 10 (key unit 12) that has received the advertising packet, the key ECU 124 establishes a state in which communication with the mobile terminal 20 is enabled by BLE communication. At this time, the key ECU 124 transmits a connection response to the mobile terminal 20 indicating that a state has been established in which BLE communication is enabled by BLE communication, through the communicator 123.

Also, in the state described above in which the BLE communication has been established, the key ECU 124 receives an authentication request including the authentication key associated with the key unit 12 from the mobile terminal 20 through the communicator 123.

Also, upon receiving the authentication request including the authentication key associated with the key unit 12 from the mobile terminal 20, the key ECU 124 authenticates the mobile terminal 20 based on the authentication key. Once the authentication has succeeded, the key ECU 124 restores the internal key information stored in the internal memory of the auxiliary storage device or the like to a usable state. The internal key information has been stored in a state not usable for authentication in the lock/unlock activator 11, for example, in an inaccessible state, in an encrypted state, or the like. Therefore, once the authentication of the mobile terminal 20 has succeeded the key ECU 124 changes the access permission of the internal memory for changing the key information into an accessible state, or based on the authentication key, decrypts the encrypted internal key information. This enables the key ECU 124 to access the internal key information that is not normally accessible so as to transmit an unlock signal or a lock signal including the internal key information to the lock/unlock activator 11, and to decrypt the encrypted internal key information based on the authentication key. Thus, the lock/unlock activator 11 can perform appropriate authentication based on the internal key information included in the unlock signal and the lock signal. Also, even if a malicious third party illegally obtains the key unit 12, the internal key information in the key unit 12 is inaccessible or encrypted, and hence, it is possible to prevent theft of the vehicle 10.

In the state described above in which the BLE communication has been established, the key ECU 124 also receives an unlock request and a lock request from the mobile terminal 20 through the communicator 123. Once the authentication of the mobile terminal 20 has succeeded (specifically, the authentication of the mobile terminal 20 has succeeded, and thereafter, the state of the established BLE communication continues), and if receiving an unlock request or a lock request from the mobile terminal 20, the key ECU 124 transmits an unlock signal or a lock signal including locking/unlocking key information to the lock/unlock activator 11 through the RF radio wave transmitter 122.

Thus, after the authentication process in the lock/unlock activator 11, locking or unlocking the door of the vehicle 10 is realized.

Also, after having transmitted an unlock signal to the lock/unlock activator 11, if receiving an unlock notice from the lock/unlock activator 11 through the LF radio wave receiver 121, the key ECU 124 transmits an unlock completion notice to the mobile terminal 20 with which the BLE communication has been established, namely, the mobile terminal 20 as the transmission source of the unlock request, through the communicator 123. Similarly, after having transmitted a lock signal to the lock/unlock activator 11, if receiving a lock notice from the lock/unlock activator 11 through the LF radio wave receiver 121, the key ECU 124 transmits a lock completion notice to the mobile terminal 20 with which the BLE communication has been established, through the communicator 123. This enables the mobile terminal 20 as the transmission source of the lock request or the unlock request based on a predetermined operation performed by the user, to confirm that the locking/unlocking of the vehicle 10A has been completed normally.

Also, as described above, when the activation switch provided in the interior of the vehicle 10 is pressed, in response to a signal in the LF band transmitted from the lock/unlock activator 11, the key ECU 124 exchanges signals with the lock/unlock activator 11.

For example, when a request signal has been received from the lock/unlock activator 11 by the LF radio wave receiver 121, the key ECU 124 transmits a response signal including the internal key information stored in the internal memory or the like to the lock/unlock activator 11, through the RF radio wave transmitter 122.

Also, for example, when an LF radio wave including a "challenge" is received from the lock/unlock activator 11 by the LF radio wave receiver 121, the key ECU 124 generates a "response" based on the internal key information and transmits the "response" to the lock/unlock activator 11 through the RF radio wave transmitter 122.

Thus, after the authentication process in the lock/unlock activator 11, start of the engine 117 is realized.

Also, an authentication key may be defined to have permission related to the function of locking/unlocking or activating the vehicle 10, which is given by the center server 30.

For example, in the case where an authentication key has permission only to unlock some of the doors of the vehicle 10, the key ECU 124 transmits through the RF radio wave transmitter 122 an unlock signal that includes information designating doors to be unlocked to the key unit 12. This enables, as described above, to unlock only some of the doors of the vehicle 10.

Also, for example, in the case where an authentication key does not include permission to activate the engine 117, it is favorable for the key ECU 124 not to perform an exchange with the lock/unlock activator 11 even if a signal in the LF band is received from the lock/unlock activator 11 through the LF radio wave receiver 121, based on a press operation on the activation switch. This enables to inhibit activation of the engine 117 depending on permission of the authentication key.

The GPS module 13 receives GPS signals transmitted from three or more, preferably four or more satellites above the vehicle 10, to measure the position of the vehicle 10. The GPS module 13 is communicably connected with the DCM 14 or the like through a one-to-one communication line or the in-vehicle network such as a CAN, and the measured positional information on the vehicle 10 is input into the DCM 14 or the like.

The DCM 14 is a communication device to bidirectionally communicate with the center server 30 through a predetermined communication network.

The DCM 14 transmits the current positional information on the vehicle 10 input from the GPS module 13 to the center server 30 at a predetermined timing or in response to a request from the center server 30. Also, the DCM 14 transmits to the center server 30 various items of vehicle information (e.g., information on unlocking of the door of the vehicle 10 or activation of the vehicle 10 that has been performed based on an authentication key obtained from the key unit 12) that can be obtained through the in-vehicle network such as a CAN or the like at a predetermined timing or in response to a request from the center server 30.

The mobile terminal 20 includes a communicator 21, a communicator 22, a processor 23, and a touch panel display (simply referred to as a "display", below) 24.

The communicator 21 is a device to perform near-field communication with the mobile terminal 20 according to the same communication standard as that of the communicator 123. As described above, in the case of the embodiment, the communicator 21 is, for example, a BLE communication module.

The communicator 22 is a device to communicate with the center server 30, the service management servers 40, and the like through a predetermined communication network. The communicator 22 is a mobile communication module corresponding to a communication standard such as LTE (Long Term Evolution), 4G (Fourth Generation), 5G (Fifth Generation), or the like.

The processor 23 performs various control processes in the mobile terminal 20. The functions of the processor 23 may be implemented discretionarily by hardware, software, or a combination of these, which may include, for example, a CPU, a RAM, a ROM, an auxiliary storage device, an RTC, and various interfaces for communication. The processor 23 includes, for example, a communication processor 231, a communication processor 232, an authentication key obtainer 233, an authentication requester 234, and a lock/unlock requester 235, as functional units implemented by executing one or more programs stored in the ROM or the auxiliary storage device on the CPU. The processor 23 also includes, for example, a storage 230 implemented as a storage area in the auxiliary storage device, and a process of holding (storing) various data items in the storage 230 is implemented by a predetermined program stored in the ROM or the auxiliary storage device.

The communication processor 231 performs bi-directional near-field communication with the key unit 12 by using the communicator 21, to transmit and receive various signals.

The communication processor 232 connects with a predetermined communication network by using the communicator 22, to transmit and receive various signals such as data signals and control signals with the center server 30, the service management servers 40, and the like.

The authentication key obtainer 233 obtains an authentication key from the center server 30, for example, in response to a predetermined operation of the user on a predetermined GUI (Graphical User Interface) displayed on the display 24, and holds the obtained authentication key in the storage 230. The following description assumes that various operations on the mobile terminal 20 are performed as operations on the GUI displayed on the display 24 linked with operations of a key application described above.

For example, the authentication key obtainer 233 of the mobile terminal 20Aa transmits an authentication key obtainment request to the center server 30 through the communication processor 232. Then, the center server 30 receives the authentication key obtainment request, and if having determined that it is a valid authentication key obtainment request, issues an authentication key. Then, the authentication key obtainer 233 obtains the authentication key delivered from the center server 30 through the communication processor 232.

Also, for example, the authentication key obtainer 233 of the mobile terminal 20Ab obtains an authentication key delivered from the center server 30 to the mobile terminal 20Ab in response to a key sharing request (described later) transmitted from the mobile terminal 20Aa to the center server 30, through the communication processor 232.

Note that the authentication key obtainer 233 of the mobile terminal 20Ab may transmit an authentication key obtainment request by itself to the center server 30 through the communication processor 232. In this case, when the center server 30 receives an authentication key obtainment request from the mobile terminal 20Ab, it is favorable to make an inquiry to the mobile terminal 20Aa of the owner user whether to permit delivery of the authentication key.

Also, for example, the authentication key obtainers 233 of the mobile terminals 20Ac, 20Ad, and 20B transmit authentication key obtainment requests to the delivery management server 50, the C2C car-sharing management server 70, and the B2C car-sharing management server 80 to obtain authentication keys, respectively. Accordingly, in response to receiving the authentication key obtainment requests, the delivery management server 50, the C2C car-sharing management server 70, and the B2C car-sharing management server 80 transmit respective authentication key arrangement requests to the center server 30, and in response to receiving the authentication key arrangement requests, the center server 30 issues authentication keys. Then, each of the authentication key obtainers 233 obtains the authentication key delivered from the center server 30 through the communication processor 232.

Note that the authentication key obtainer 233 of each of the mobile terminals 20Ac, 20Ad, and 20B may transmit the authentication key obtainment request to the center server 30 through the communication processor 232. In this case, the center server 30 may make an inquiry to each of the delivery management server 50, the C2C car-sharing management server 70, and the B2C car-sharing management server 80 to determine whether or not it is a valid authentication key obtainment request.

The authentication requester 234 transmits an authentication request to the key unit 12 of the vehicle 10 through the communication processor 231, to request authentication of the mobile terminal 20 as a remote controller for locking/unlocking the door of the vehicle 10. For example, if the authentication requester 234 finds a key unit corresponding to the authentication key, specifically, if an advertising packet corresponding to the key unit 12 is received by the communication processor 231, the authentication requester 234 may transmit an authentication request to the key unit 12. Also, for example, the authentication requester 234 may transmit an authentication request to the key unit 12 in response to a predetermined operation performed by the user.

In response to a predetermined operation performed by the user, the lock/unlock requester 235 transmits an unlock request including an authentication key or a lock request including an authentication key to the key unit 12 through the communication processor 231. This enables to lock/unlock the door of the vehicle 10 based on an authentication process in the key unit 12 even when an unlock request or a lock request has been transmitted to the key unit 12 before an authentication request is transmitted by the authentication requester 234. For example, on the GUI as an operation screen of the display 24, an unlock button to make a request for unlocking the vehicle 10, and a lock button to make a request for locking the vehicle 10 may be presented. In this case, when the lock button is touched, a lock request may be transmitted, and when the unlock button is touched, an unlock request may be transmitted. Also, a lock request and an unlock request may be transmitted in response to a predetermined operation performed on a hardware operation unit provided on the mobile terminal 20.

For example, the functions of the authentication key obtainer 233, the authentication requester 234, and the lock/unlock requester 235 may become available to the user by activating a key application program installed in the ROM or the auxiliary storage device of the processor 23. The following description assumes that the functions of the authentication key obtainer 233, the authentication requester 234, and the lock/unlock requester 235 of the processor 23 become available to the user by activating a key application that has been installed in the processor 23 (the auxiliary storage device or the ROM).

The display 24 is, for example, a liquid crystal display or an organic EL (Electroluminescence) display, and is a display device that is provided on the front surface of the mobile terminal 20, and also serves as an operation unit of a known type of touch panel.

The center server 30 includes a communicator 31 and a processor 32.

The functions of the center server 30 may be divided to be implemented on multiple servers. In the following, the same applies to the delivery management server 50, the EC server 60, the C2C car-sharing management server 70, and the B2C car-sharing management server 80.

The communicator 31 is a device to bidirectionally communicate with each of the vehicles 10, the mobile terminals 20, and the service management servers 40 through a predetermined communication network.

The processor 32 performs various control processes in the center server 30. The functions of the processor 32 may be implemented discretionarily by hardware, software, or a combination of these, which may be constituted with one or more server computers each of which includes, for example, a CPU, a RAM, a ROM, an auxiliary storage device, an RTC, and a predetermined communication interface. This also applies to the processors 52, 62, 72, and 82 (described later) of the delivery management server 50, the EC server 60, the C2C car-sharing management server 70, and the B2C car-sharing management server 80, respectively. The processor 32 includes, for example, a communication processor 3201, a condition determiner 3202, and an authentication key issuer 3203, as functional units implemented by executing one or more programs stored in the ROM or the auxiliary storage device on the CPU. Also, the processor 32 includes, for example, a storage 3200 that is implemented as a storage area defined in the auxiliary storage device of the server computer or an external storage device connected to the server computer, and a process of holding (storing) various data items in the storage 3200 is implemented by a program stored in the ROM or the auxiliary storage device. In the following, the same applies to the storages 520, 620, 720, and 820, which will be described later.

The communication processor 3201 controls the communicator 31 and exchanges various signals such as control signals and information signals with each of the vehicles 10, the mobile terminals 20, and the service management servers 40.

In response to receiving an authentication key obtainment request from the mobile terminal 20 or an authentication key arrangement request from the service management servers 40, which are received by the communication processor 3201, the condition determiner 3202 determines whether the transmitted request is a valid authentication key obtainment request or authentication key arrangement request.

If it has been determined by the condition determiner 3202 that the authentication key obtainment request or the authentication key arrangement request is valid, the authentication key issuer 3203 identifies the specification of an authentication key to be issued, and issues an authentication key corresponding to the identified specification. For example, the authentication key issuer 3203 identifies the vehicle 10 to be locked/unlocked by the authentication key or the key unit 12 or the like corresponding to the vehicle 10. Also, for example, the authentication key issuer 3203 specifies permission of the authentication key in terms of a valid (usable) period of the authentication key or the number of usable times of the authentication key. Also, for example, the authentication key issuer 3203 specifies permission of the authentication key in terms of locking/unlocking and activation of the vehicle 10, such as doors that can be locked/unlocked, and whether or not the vehicle 10 can be activated, and the like. Also, for example, the authentication key issuer 3203 specifies permission of the authentication key with respect to temporary key sharing, which will be described later, such as whether to allow sharing the authentication key with another mobile terminal 20 by temporary key sharing; a period during which the authentication key can be shared with other mobile terminals 20; and the number of times to be shared. In the following, permission of an authentication key in terms of the usable period, the number of usable times, and the like; permission of the authentication key in terms of unlocking or activation of the vehicle 10; and permissions of the authentication key with respect to temporary key sharing will be simply referred to as "various items of permission of the authentication key", collectively. Then, the authentication key issuer 3203 delivers the authentication key issued to the target mobile terminal 20 through the communication processor 3201.

[Details of Configuration Related to Key-Sharing Service]

Next, with reference to FIG. 3, a configuration related to the key-sharing service in the authentication key management system 1 will be described.

Figure 3:
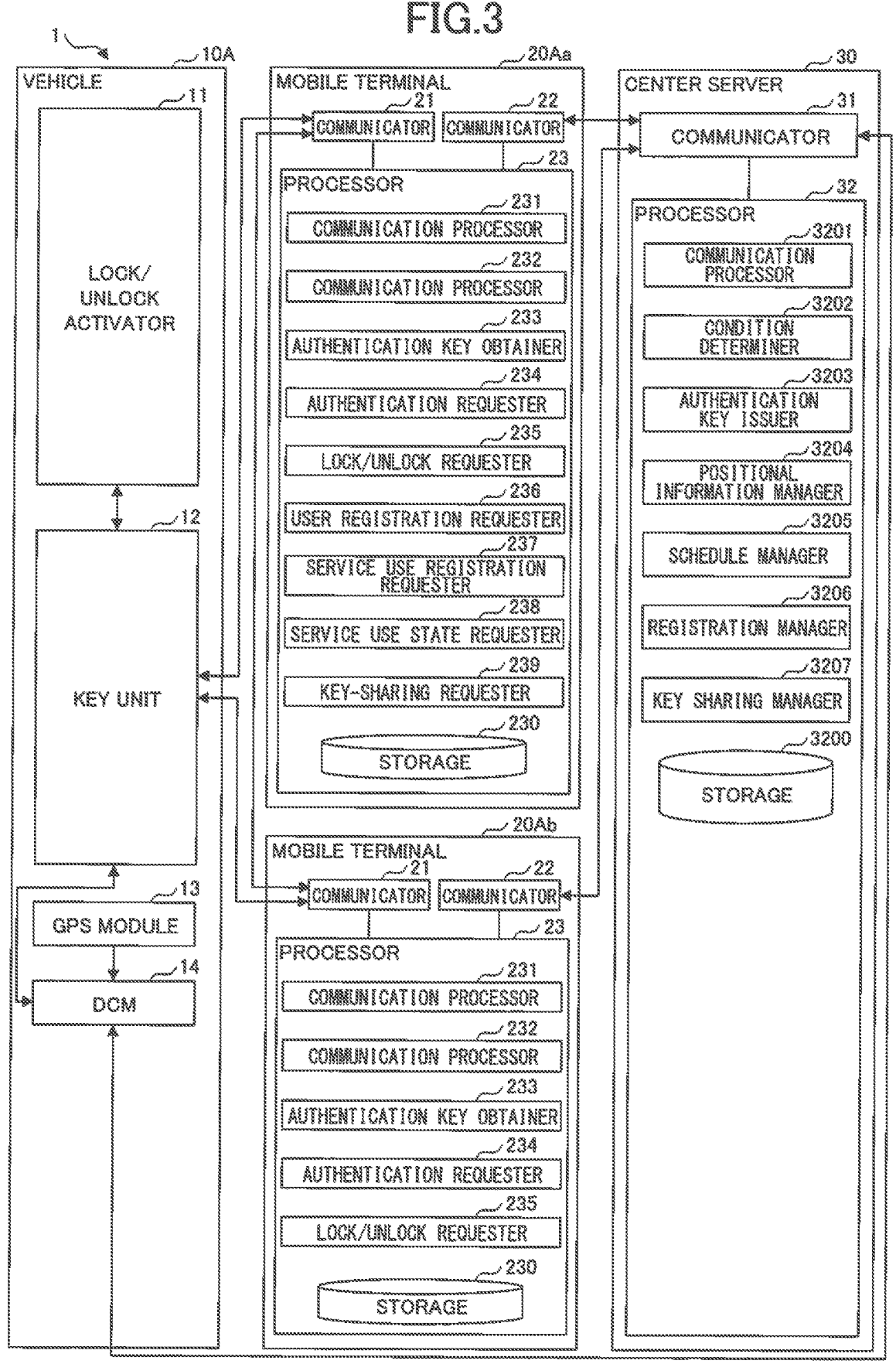
FIG. 3 is a diagram mainly illustrating an example of a configuration related to a key-sharing service in an authentication key management system.

FIG. 3 is a diagram mainly illustrating an example of a configuration related to the key-sharing service in the authentication key management system 1. In the following, referring to FIG. 3, the configuration related to the key-sharing service in the authentication key management system 1 will be mainly described, and duplicate description will be omitted as much as possible for the duplicate elements that have been described with the locking/unlocking and activation of the vehicle 10. The same applies to the description of FIGS. 4 to 6.

As described above, the processor 23 of the mobile terminal 20Aa carried by the owner user of the vehicle 10A includes the communication processor 231, the communication processor 232, the authentication key obtainer 233, the authentication requester 234, and the lock/unlock requester 235. The processor 23 of the mobile terminal 20Aa further includes a user registration requester 236, a service use registration requester 237, a service use state requester 238, and a key sharing requester 239, as functional units implemented by executing one or more programs stored in the ROM or the auxiliary storage device on the CPU.

In the embodiment, the following description assumes that the functions of the user registration requester 236, the service use registration requester 237, the service use state requester 238, and the key sharing requester 239 of the mobile terminal 20Aa become available to the owner user when the key application has been activated and the user authentication based on bidirectional communication with the center server 30 has succeeded. The following description also assumes that the user authentication is performed on the center server 30 based on an ID determined in advance for the owner user (referred to as an "owner user ID", below) and a password corresponding to the owner user ID.

The user registration requester 236 requests the center server 30 to register a regular user of the vehicle 10A who uses various services (in other words, the key-sharing service, the trunk delivery service, and the C2C car-sharing service) that use the vehicle 10A, in response to a predetermined operation performed by the owner user. For example, the user registration requester 236 transmits a user registration request including the owner user ID, password, and attribute information (e.g., name, age, relationship with the owner user, etc.) that specify a child user to be registered, to the center server 30 through the communication processor 232.

Also, when a notice indicating that the registration of the child user has been completed (notice of user registration completion) is received from the center server 30 by the communication processor 232, the user registration requester 236 transmits an ID of the child user (referred to as a "child user ID", below) and the password included in the notice of user registration completion in the storage 230. At this time, the user registration requester 236 may transmit the child user ID and the password to the mobile terminal 20Ab carried by the registered child user through the communication processor 231 in response to a predetermined operation performed by the owner user.

In response to a predetermined operation by the owner user, the service use registration requester 237 requests the center server 30 to register various services using the vehicle 10A by the regular user of the vehicle 10A. In other words, as described above, the service use registration requester 237 requests registration of the permission for authentication key arrangement of the key-sharing manager 3207 and the service management servers 40 corresponding to the various services for the regular user of the vehicle 10A to use the various services. For example, the service use registration requester 237 transmits the owner user ID and the password; information for identifying the vehicle 10A used for the various services; information for specifying the target services; and the ID of the regular user who uses the target services (the owner user ID or the child user ID), to the center server 30 through the communication processor 232. In the following, the owner user ID and the child user ID may be collectively referred to as the "regular user ID". This enables the service use registration requester 237 to register the child user who uses the key-sharing service in the center server 30.

Also, the service use registration requester 237 receives, through the communication processor 232 from at least one of the center server 30 and the service management servers 40, a notice indicating that the use registration of the services based on the service use registration request has completed. Then, the service use registration requester 237 causes the display 24 to display that the use registration of the specific services by the regular user of the vehicle 10A based on the predetermined operation performed by the owner user has been completed. This enables the owner user to recognize that use registration of the specific service by the regular user has been completed.

In response to a predetermined operation performed by the owner user, the service use state requester 238 requests the center server 30 information on the use state of various services including the key-sharing service by the regular user of the vehicle 10A whose use registration has been completed in a form corresponding to the owner user ID (service use state information). For example, the service use state requester 238 transmits a service use state request including the owner user ID and the password to the center server 30 through the communication processor 232. Then, when the service use state information to be received from the center server 30 is received by the communication processor 232, the service use state requester 238 displays the service use state information on the display 24. This enables the owner user to comprehensively recognize the information on the use state of various services by each of the regular users registered in the center server 30, in an aspect associated with the owner user ID.

In response to a predetermined operation performed by the owner user, the key sharing requester 239 requests the center server 30 to deliver the authentication key for locking/unlocking or activating the vehicle 10A, to the child user registered for using the key-sharing service. For example, the key sharing requester 239 transmits a key-sharing request that includes the owner user ID and the password; information for identifying the vehicle 10A to be locked and unlocked by the authentication key; and information for identifying a child user (e.g., the child user ID) to whom the authentication key is to be delivered (shared), to the center server 30 through the communication processor 232. At this time, the key sharing request may include use period information (e.g., use start date and time and use end date and time) related to a period during which the delivered authentication key is available, which can be set by a predetermined operation performed by the owner user. Also, the key sharing request includes permission information on various items of permission of the authentication key that include permission of the authentication key related to the usable period and the number of usable times; permission of the authentication key related to unlocking or activation of the vehicle; and permission of the authentication key related to temporary key sharing, which will be described later. These items may be set by a predetermined operation performed by the owner user. This enables, as will be described later, the owner user to limit use of the vehicle 10A by a user other than the owner user, by appropriately setting the permission information, in the case of sharing the authentication key that can be used at the same time among multiple mobile terminals 20. Therefore, the security of the vehicle 10A can be improved.

Also, the key sharing requester 239 may set the mobile terminals 20 of multiple regular users of the vehicle 10A (in other words, at least one of the mobile terminals 20Aa and 20Ab) as delivery targets in response to a predetermined operation performed by the owner user, to request the center server 30 to deliver authentication keys whose use periods overlap. In other words, a key sharing request may have multiple regular users specified to whom authentication keys are to be delivered, and the users may include the owner user. In the key sharing request, available periods of the authentication keys specified for the multiple regular users may overlap each other. This enables the multiple regular users to share the authentication key of the vehicle 10A that can be used at the same time. Therefore, for example, when multiple occupants ride on the vehicle 10A for a trip, camping, or the like, each of the occupants can lock/unlock the vehicle 10A without lending and borrowing a single mobile terminal 20 that stores the authentication key. Therefore, the convenience of the users can be improved.

Also, in response to a predetermined operation performed by the owner user, the key sharing requester 239 may cause an already-delivered authentication key to be shared with another mobile terminal 20 (in other words, a mobile terminal 20 having the key application installed) (this sharing mode of an authentication key will be referred to as "temporary key sharing", below). At this time, the other mobile terminal 20 may be the mobile terminal 20Ab of a child user, or a mobile terminal 20 of a user other than the child user, namely, a user who temporarily uses the vehicle 10A.

For example, the key sharing requester 239 transmits an authentication key (specifically, a copy of the authentication key) to another mobile terminal 20 through the communication processor 231. This enables the owner user of the vehicle 10A, even if multiple occupants are to suddenly ride on the vehicle 10A such as for a trip, to share the authentication key with the other users. Also, it is possible to share the authentication key that can be used at the same time with the other mobile terminals 20 directly from the mobile terminal 20Aa. Therefore, for example, even when the mobile terminal 20Aa is in a poor communication state or out of a communication range in a wireless mobile communication network, the owner user of the vehicle 10A can share the authentication key with the other users.

At this time, the key sharing requester 239 may transmit an authentication key that has limited permission set or specified in advance based on a predetermined operation performed by the owner user, with respect to the usable period or the number of usable times, and/or unlocking or activating the vehicle 10A, to the other mobile terminals 20 through the communication processor 231. Specifically, for example, an authentication key to be transmitted to the other mobile terminals 20 may have permission limited in terms of the usable period to be 30 minutes; the number of usable times to once; doors that can be locked/unlocked limited to only entry/exit doors of the vehicle 10A; and/or activation of the vehicle 10A being disabled. In the following, the same applies to the case of the temporary key sharing performed through the center server 30. This enables to improve the security of the vehicle 10A with the temporary key sharing.

Also, when performing the temporary key sharing, as in the case of the normal key sharing, the key sharing requester 239 may cause the center server 30 to deliver the authentication keys to the other mobile terminals 20. At this time, the key sharing requester 239 may transmit to the center server 30, through the communication processor 232, a temporary key sharing request that includes information identifying an authentication key that has been delivered (e.g., the issued ID or the like embedded in the authentication key) and information specifying other mobile terminals 20 as delivery targets, to cause the center server 30 to deliver the authentication keys to the other mobile terminals 20.

For example, in the case where the other mobile terminal 20 is the mobile terminal 20Ab of the child user, the key sharing requester 239 may transmit a temporary key sharing request including the child user ID to the center server 30 through the communication processor 232.

Also, for example, the key sharing requester 239 obtains predetermined identification information (e.g., a QR code (registered trademark) of a user of another mobile terminal 20 registered in the center server 30 as the user who has the key application installed in the terminal) from the other mobile terminal 20, through the communication processor 231 and the like. Then, the key sharing requester 239 may transmit to the center server 30 a temporary key sharing request in which the other mobile terminal 20 identified based on the identification information is specified as the delivery target.

Note that the mobile terminal 20Aa may obtain the identification information by another method. For example, the mobile terminal 20Aa may use an installed camera function to recognize the identification information displayed on the display 24 of another mobile terminal 20, so as to obtain the identification information corresponding to the user of the other mobile terminal 20. Alternatively, for example, the mobile terminal 20Aa may obtain the identification information that has been transmitted from the user of the other mobile terminal 20 to a mail address or an account of the SNS of the owner user.

Also, for example, in response to a predetermined operation performed by the owner user, the key sharing requester 239 transmits a candidate terminal information request requesting for candidate terminal information on candidate terminals as other mobile terminals 20 existing around the current position of the mobile terminal 20Aa, to the center server 30 through the communication processor 232. Also, when the candidate terminal information is received from the center server 30 by the communication processor 232, the key sharing requester 239 causes the display 24 to display the candidate terminal information. At this time, the candidate terminal information returned from the center server 30 may include information that identifies a candidate terminal on which a specific operation or action is being performed among the candidate terminals. This enables the owner user of the vehicle 10A, when one of the users of the other mobile terminals 20 as the key sharing targets performs the specific operation or action on the mobile terminal 20, to identify the other mobile terminal 20 from among the candidate terminals displayed on the display 24 of the mobile terminal 20Aa. Then, the key sharing requester 239 may transmit to the center server 30 a temporary key sharing request that designates the other mobile terminal 20 identified from among the candidate terminals as a delivery target by a predetermined operation performed by the owner user.

Also, in response to a predetermined operation performed by the owner user, the key sharing requester 239 may transmit, to the mail address or the account of SNS of the user of the other mobile terminal 20 through the communication processor 232, link information based on the URL (Uniform Resource Locator) scheme for activating the key application (simply referred to as "link information", below), so as to allow the other mobile terminal 20 to obtain the authentication key from the center server 30. At this time, in response to the predetermined operation performed by the owner user, the key sharing requester 239 transmits a temporary key sharing request specifying an obtained authentication key to the center server 30 through the communication processor 232, to obtain the link information returned from the center server 30 in response to the temporary key sharing request. This enables the key sharing requester 239 to deliver the authentication key from the center server 30 to another mobile terminal 20.

Also, the temporary key sharing may be implemented to be executable from the mobile terminal 20Ab of the child user to which an authentication key has already been delivered. In other words, the functions related to the temporary key sharing in the key sharing requester 239 may be included in the functions of the key application installed in the processor 23 of the mobile terminal 20Ab of the child user. Thereby, even when multiple occupants not including the owner user are riding on the vehicle 10A, there is no need to lend and borrow among the multiple occupants the mobile terminal 20Ab of the child user who has already obtained the authentication key, and hence, the convenience can be further improved for the child user of the vehicle 10. The following description assumes that the temporary key sharing is available from the mobile terminal 20Ab of the child user.

As described above, the processor 32 of the center server 30 includes the communication processor 3201, the condition determiner 3202, the authentication key issuer 3203, and the storage 3200. The processor 32 of the center server 30 also includes, for example, a positional information manager 3204, a schedule manager 3205, a registration manager 3206, and a key-sharing manager 3207 as functional units implemented by executing one or more programs stored in an auxiliary storage device or the like of the server computer on the CPU.

When an authentication key obtainment request is received from the mobile terminal 20Aa or 20Ab by the communication processor 3201, the condition determiner 3202 performs authentication based on a regular user ID and the password included in the authentication key obtainment request. For example, the condition determiner 3202 verifies each regular user ID and the corresponding password registered in the storage 3200 with the regular user ID and the password included in the authentication key obtainment request, and if there is a match, determines that the authentication succeeds, namely, it is a valid key obtainment request.

Also, the condition determiner 3202 determines whether or not an authentication key arrangement request transmitted from the key-sharing manager 3207, which will be described later, is a valid authentication key arrangement request. For example, the condition determiner 3202 may determine that the authentication key arrangement request is a valid key arrangement request if authentication succeeds based on authentication information (e.g., ID and password) and the like included in the authentication key arrangement request from the key-sharing manager 3207.

If it has been determined by the condition determiner 3202 that it is a valid key obtainment request or a valid key arrangement request, the authentication key issuer 3203 issues an authentication key, and delivers the authentication key to the target mobile terminal 20 through the communication processor 3201.

The positional information manager 3204 manages positional information on the vehicles 10 (10A, 10B). Specifically, the positional information manager 3204 transmits a positional information request to the vehicle 10 through the communication processor 3201. In response to the positional information request, the DCM 14 of the vehicle 10 returns the positional information on the vehicle 10 input from the GPS module 13 to the center server 30, and thereby, the positional information manager 3204 can obtain the positional information on the vehicle 10.

For example, the positional information manager 3204 obtains the positional information from the vehicle 10A through the communication processor 3201, and monitors the positional information on the vehicle 10A in real time, to follow the movement state of the vehicle 10A. This enables, for example, the positional information manager 3204 to inform the owner user of the positional information on the vehicle 10A lent to a child user, through the communication processor 3201. Also, for example, the positional information manager 3204 can transmit information on whether or not the vehicle 10A to be lent to a child user is heading for a specified position (home or the like) or how long it will take to return, to the mobile terminal 20Ab of the child user through the communication processor 3201.

The schedule manager 3205 manages the use state of the vehicle 10A related to various services. For example, the schedule manager 3205 periodically obtains information on a use schedule of the vehicle 10 by the key-sharing service from the key-sharing manager 3207, specifically, available dates and times of the authentication key delivered by the key-sharing service. Also, the schedule manager 3205 obtains a use schedule of the vehicle 10A by the trunk delivery service from the delivery management server 50, and a use schedule of the vehicle 10A by the C2C car-sharing service from the C2C car-sharing management server 70, respectively, through the communication processor 3201. Then, based on the obtained use schedules of the vehicle 10A related to the respective services, the schedule manager 3205 generates information (vehicle use schedule information) on the use schedule of the vehicle 10A across the multiple services, and updates the old use schedule information stored in the storage 3200.

In response to a user registration request received by the communication processor 3201 from the mobile terminal 20Aa of the owner user, the registration manager 3206 registers a regular user (child user) who uses various services. For example, the registration manager 3206 verifies the owner user ID and the password included in the user registration request from the mobile terminal 20Aa with each owner user ID and the password stored in the storage 3200, and if there is a match, determines that it is a valid user registration request, namely, the authentication succeeded. Then, the registration manager 3206 registers the child user ID included in the valid user registration request, in a user service registration information DB (Data Base) in the storage 3200 as a regular user who can use various services.

Also, the registration manager 3206 performs use registration of various services by a regular user of the vehicle 10A in response to a service use registration request received from the mobile terminal 20Aa of the owner user by the communication processor 3201. In other words, in response to a service use registration request, the registration manager 3206 registers permission for authentication key arrangement by the key-sharing manager 3207 and the service management servers 40 corresponding to various services for a user of the vehicle 10A to use various services. For example, the registration manager 3206 performs an authentication process similar to the above, based on the owner user ID and the password included in the service use registration request from the mobile terminal 20Aa, to determine whether or not it is a valid service use registration request. If it is a valid service use registration request, the registration manager 3206 further determines whether or not the regular user ID included in the service use registration request has already been registered in the user service registration information DB. Then, if the regular user ID included in the service use registration request has already been registered in the user service registration information DB, the registration manager 3206 registers a target service identified by the service use registration request, as a service usable by the regular user corresponding to the regular user ID in the user service registration information DB (Data Base) in the storage 3200.

Specifically, the registration manager 3206 builds the user service registration information DB such that the owner user ID is associated with service-specific information for identifying a target service, vehicle-specific information for identifying the vehicle 10A, a regular user ID for identifying a regular user who uses the service, and service link information for associating the vehicle-specific information and the regular user ID corresponding to the vehicle 10A with the target service.

The service-specific information is, for example, a service ID defined for each of the services. Specifically, for example, if there are multiple companies that provide respective C2C car-sharing services, a unique service ID is defined for each of the multiple companies, or for example, if the same company provides multiple C2C car-sharing services, a unique ID is defined for each of the multiple services provided by the same company. Also, if at least one of the trunk delivery service and the trunk pickup service is provided by a combination of multiple delivery companies and companies corresponding to multiple EC sites (referred to as "EC companies", below), a unique service ID may be defined for each combination of a delivery company and an EC company, or a target service may be specified by a combination of a unique service ID defined for each of the multiple delivery companies and a unique service ID defined for each of the multiple EC companies.

The vehicle-specific information may be defined discretionarily as long as a vehicle 10A to be locked/unlocked or activated by an authentication key can be identified. For example, it may be identification information such as a vehicle ID or VIN defined for each vehicle 10A, or, for example, may be identification information such as a key unit ID defined for the key unit 12 of the vehicle 10A, as IDs are also defined for the other in-vehicle devices related to locking/unlocking a door or activation based on an authentication key installed in the vehicle 10A. The following description assumes that the vehicle-specific information is the key unit ID.

The service link information is information necessary for the authentication key issuer 3203 to issue an authentication key of a target vehicle 10A and to deliver an authentication key to a target mobile terminal 20, when an authentication key arrangement request is transmitted by the key-sharing manager 3207, the delivery management server 50, the EC server 60, and the C2C car-sharing management server 70 that manage respective services. In other words, upon receiving an authentication key arrangement request including service link information from the key-sharing manager 3207, the delivery management server 50, the EC server 60, and the C2C car-sharing management server 70, the authentication key issuer 3203 can identify the vehicle 10A to be locked/unlocked or to be activated with the authentication key, so as to issue an appropriate authentication key.

The service link information may be defined discretionarily as long as the center server 30 can identify a target service associated with a vehicle 10A and a user using the service. For example, the service link information may be a login ID of a regular user on a website for users of various services corresponding to the key-sharing manager 3207, the delivery management server 50, the EC server 60, and the C2C car-sharing management server 70, or the like (referred to as a "service login ID" for the sake of convenience, below). In this case, the service use registration requester 237 of the mobile terminal 20Aa transmits a service use registration request including the service login ID of the regular user to be registered corresponding to various services to the center server 30 through the communication processor 232. Also, if the regular user to be registered corresponding to the various services has not yet obtained a service login ID, the processor 23 of the mobile terminal 20Aa may activate a predetermined browser so as to have the user obtain the service login ID on the websites of the various services. Thereby, when a user (a regular user of the vehicle 10A) logs in to the website when requesting a target service, the delivery management server 50 or the C2C car-sharing management server 70 can identify the service login ID corresponding to the service link information, and can easily arrange the authentication key related to the service provision. The following description assumes that the service link information on the trunk delivery service and the C2C car-sharing service is the service login ID described above.

Also, in the case of a regular user regularly using multiple vehicles 10A, the center server 30 cannot identify a vehicle 10A even though the service login ID alone can identify the regular user. Therefore, the service link information includes, in addition to the service login ID, information for indirectly identifying the vehicle 10A (e.g., information obtained by encrypting the vehicle-specific information in a predetermined method).

When a use registration of various services is completed, the registration manager 3206 indicates the completion to the mobile terminals 20Aa and 20Ab corresponding to the regular users to be registered, through the communication processor 3201. When the use registration of the various services is completed, the registration manager 3206 also transmits a service use registration completion notice including the service link information to the key-sharing manager 3207 and the service management servers 40, which operate and manage the services to be registered.

Note that the completion notice of the use registration of various services to the mobile terminals 20Aa and 20Ab may be transmitted from the service management servers 40 that have received the service use registration completion notice.

Also, when a service use state request is received from the mobile terminal 20Aa by the communication processor 3201, the registration manager 3206 generates service use state information based on the user service registration information DB in the storage 3200 and the vehicle use schedule information managed by the schedule manager 3205, to deliver the generated information to the mobile terminal 20Aa through the communication processor 3201.

The key-sharing manager 3207 operates and manages the key-sharing service.

For example, in response to a key sharing request received from the mobile terminal 20Aa of the owner user by the communication processor 3201, the key-sharing manager 3207 arranges an authentication key to be delivered to the mobile terminals 20Aa and 20Ab corresponding to the regular user IDs specified in the key sharing request. Specifically, the key-sharing manager 3207 verifies the owner user ID and the password included in the key sharing request with each owner user ID and the password stored in the storage 3200, and if there is a match, determines that it is a valid key sharing request. Also, the key-sharing manager 3207 makes an inquiry to the schedule manager 3205, to determine whether there is incompatibility between the use period information included in the key sharing request and the latest vehicle use schedule information, namely, whether there is an overlap in use dates and times of the vehicle 10A across the multiple services and multiple regular users. Then, if there is no overlap of the use time, the key-sharing manager 3207 transmits to the authentication key issuer 3203 an authentication key arrangement request including information on the regular users corresponding to the mobile terminals 20Aa and 20Ab to which the authentication keys are to be delivered; information on the vehicle 10A to be locked/unlocked or activated by the authentication key, which is identified from the information included in the key sharing request; and permission information such as the usable period and the number of usable times for each of the mobile terminals 20Aa and 20Ab, the unlockable doors, and the activation authorization. This enables the authentication key issuer 3203 to identify the regular user IDs corresponding to the mobile terminals 20Aa and 20Ab to which the authentication keys are to be delivered, the vehicle 10A to be locked/unlocked or activated by the authentication key, and to issue the appropriate authentication keys.

Also, the key-sharing manager 3207 confirms attribute information on the users of the mobile terminals 20Aa and 20Ab to which the authentication keys are to be delivered as specified in the key sharing request (e.g., the age and possession of a driver's license), which is stored in the storage 3200. Then, if having determined that the users of the mobile terminals 20Aa and 20Ab (regular users of the vehicle 10A) to which the authentication keys are to be delivered are users who cannot drive the vehicle 10A, the key-sharing manager 3207 arranges such that authentication keys with permission in which activation of the vehicle 10A is disabled are issued to the mobile terminals 20 of the users. A user who cannot drive the vehicle 10A is, for example, a user who has not reached the age to obtain a driver's license, a user who does not obtain a driver's license or the like. Specifically, the key-sharing manager 3207 transmits to the authorization key issuer 3203 an authentication key arrangement request such that permission information corresponding to the mobile terminals 20Aa and 20Ab corresponding to the users who have been determined as unable to drive the vehicle 10A includes inhibition of activation of the vehicle 10A. This enables the authentication key issuer 3203 to deliver authentication keys given with permission including inhibition of activation of the vehicle 10A to the mobile terminals 20Aa and 20Ab of the users who cannot drive the vehicle 10A, and hence, to improve the safety of the vehicle 10A.

Also, for example, based on a temporary key sharing request received from the mobile terminal 20Aa of the owner user by the communication processor 3201, the key-sharing manager 3207 delivers the authentication key of the vehicle 10A to the other mobile terminals 20 specified in the temporary key sharing request. Specifically, based on an installation user information DB of the key application stored in the storage 3200, the key-sharing manager 3207 identifies the ID of the installation user corresponding to each of the other mobile terminals 20 (referred to as "installation user ID", below) as delivery targets. Then, the key-sharing manager 3207 transmits to the authentication key issuer 3203 an authentication key arrangement request that includes information on the specified installation user IDs and authentication keys specified in the temporary key sharing request (e.g., the issuance ID of each authentication key included in the temporary key sharing request). This enables the authentication key issuer 3203 to identify the other mobile terminals 20 as the delivery targets based on the installation user IDs, the issuing IDs of the authentication keys, and the like, and to deliver the authentication keys to the other mobile terminals 20 through the communication processor 3201.

Note that the functions of the key-sharing manager 3207 may be transferred to a server (key sharing management server) outside of the center server 30, which may be included in the service management servers 40 as in the case of the other services using the vehicle 10A.

As described above, the mobile terminal 20Ab carried by the child user includes the communication processor 231, the communication processor 232, the authentication key obtainer 233, the authentication requester 234, the lock/unlock requester 235, and the storage 230.

Note that in the embodiment, the following description assumes that the functions of the authentication key obtainer 233 of the mobile terminal 20Ab become available for the child user when the key application has been activated and the user authentication based on the bidirectional communication with the center server 30 has succeeded. The following description also assumes that the user authentication is performed on the center server 30 based on the child user ID and the password. The following description also assumes that the functions of the authentication requester 234 and the lock/unlock requester 235 of the mobile terminal 20Ab become available for the child user when the key application has been activated.

As described above, the authentication key obtainer 233 obtains an authentication key delivered from the center server 30 in response to a key sharing request transmitted from the mobile terminal 20Aa to the center server 30 through the communication processor 232. This enables the mobile terminal 20Ab to lock/unlock the door of the vehicle 10A and to activate the vehicle 10A based on the functions of the communication processor 231, the authentication requester 234, and the lock/unlock requester 235. In other words, the key-sharing service enables the child user carrying the mobile terminal 20Ab to directly use the vehicle 10A, namely, to lock/unlock the vehicle 10A and to drive the vehicle 10A by using the mobile terminal 20Ab without exchanging a key with the owner user. Similarly, the owner user can lend the vehicle 10A to the child user without exchanging a key with the child user. Therefore, the key-sharing service in the authentication key management system 1 enables to improve the convenience in lending and borrowing the vehicle 10A between the owner user and the child user of the vehicle 10A.

Also, as described above, the authentication key obtainer 233 obtains an authentication key delivered from the center server 30 in response to a temporary key sharing request transmitted from the mobile terminal 20Aa to the center server 30 through the communication processor 232. The same applies to a case where authentication keys are delivered to the mobile terminals 20 other than the mobile terminal 20Ab of the child user in response to a temporary key sharing request. This enables the mobile terminals 20 including the mobile terminal 20Ab to lock/unlock the door of the vehicle 10A and/or to activate the vehicle 10A, based on the functions of the communication processor 231, the authentication requester 234, and the lock/unlock requester 235. In other words, even when the child user carrying the mobile terminal 20Ab has not obtained the authentication key in advance, for example, when multiple occupants including other regular users ride on the vehicle 10A for an outing or the like, the child user does not need to borrow the mobile terminal 20Aa to which the authentication key has already been delivered, and can directly use the vehicle 10A to lock/unlock the vehicle 10A and to drive the vehicle 10A by using the mobile terminal 20Ab. Similarly, even if the owner user has not caused the mobile terminal 20Ab of the child user to obtain the authentication key delivered in advance, the owner user does not need to lend his mobile terminal 20Aa to the child user. Therefore, the temporary key sharing in the authentication key management system 1 enables to improve the convenience of users in the case where the vehicle 10A is used by multiple people including regular users of the vehicle 10A.

[Details of Configuration of Trunk Delivery Service and Trunk Pickup Service]

Next, with reference to FIG. 4, a configuration related to the trunk delivery service and trunk pickup service in the authentication key management system 1 will be described.

Figure 4:
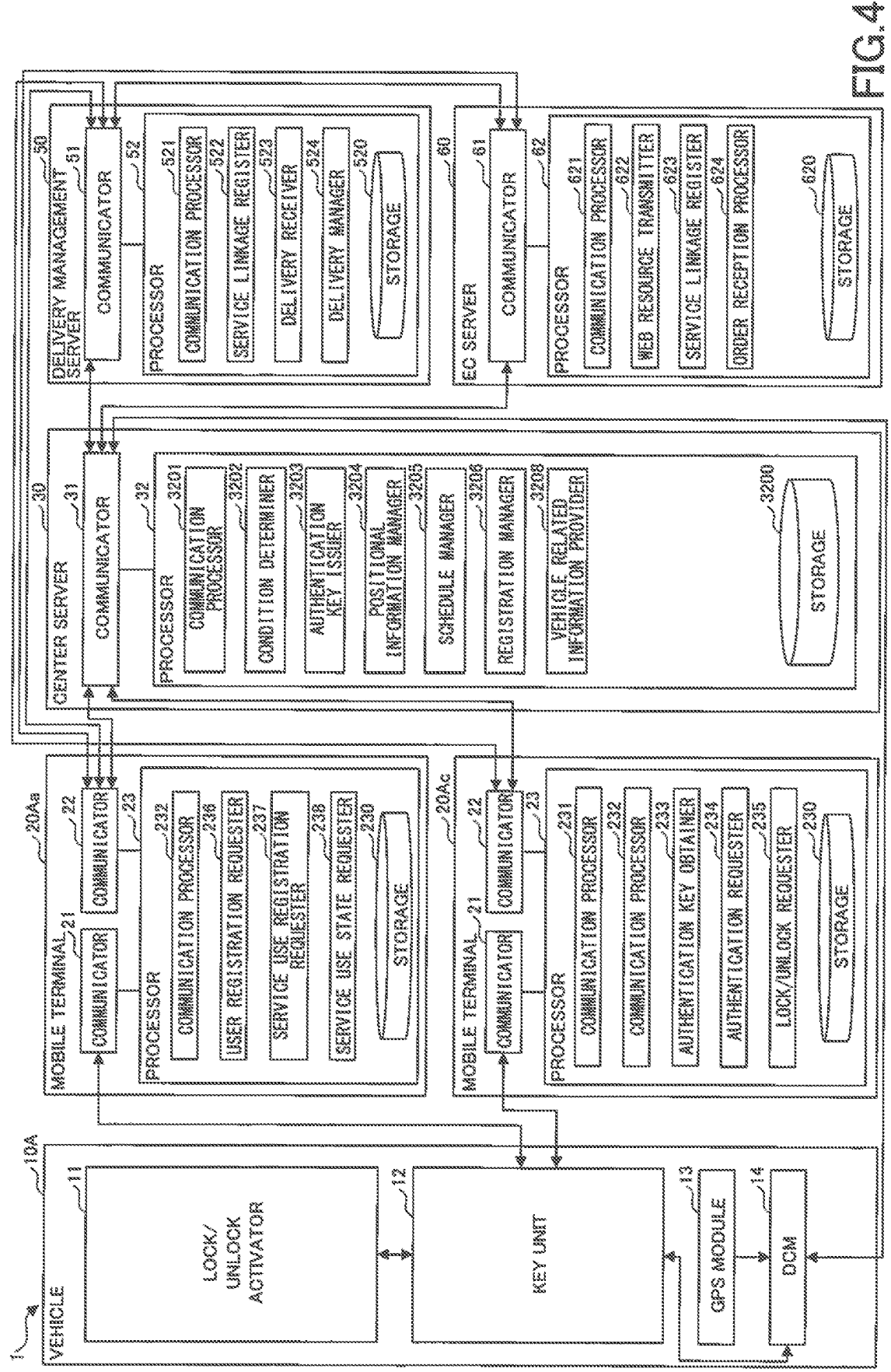
FIG. 4 is a diagram mainly illustrating an example of a configuration related to a trunk delivery service and a trunk pickup service in an authentication key management system.

FIG. 4 is a diagram mainly illustrating an example of a configuration related to the trunk delivery service and the trunk pickup service in the authentication key management system 1. In the following, referring to FIG. 4, the configuration related to the trunk delivery service and the trunk pickup service in the authentication key management system 1 will be mainly described, and duplicate description will be omitted as much as possible for the duplicate elements that have been described with the key-sharing service.

As described above, the processor 23 of the mobile terminal 20Aa carried by the owner user of the vehicle 10A includes the communication processor 232, the user registration requester 236, the service use registration requester 237, and the service use state requester 238.

As described above, the user registration requester 236 requests the center server 30 to register a regular user (child user) of the vehicle 10A who uses various services including the trunk delivery service and the trunk pickup service, in response to a predetermined operation performed by the owner user.

As described above, the service use registration requester 237 requests the center server 30 to perform use registration of various services including the trunk delivery service and the trunk pickup service for each of the registered regular users (an owner user or a child user), in response to a predetermined operation performed by the owner user.

For example, the service use registration requester 237 transmits to the center server 30 a service use registration request for using the trunk delivery service and the trunk pickup service, which includes the service login ID on a website for users who use the service of the delivery management server 50 (referred to as a "delivery site", below) and the service login ID on the EC site, as the service link information corresponding to a regular user of the vehicle 10A to be registered.

Note that the service use registration may be performed individually for each of the trunk delivery service and the trunk pickup service.

As described above, in response to a predetermined operation performed by the owner user, the service use state requester 238 requests the center server 30 information on the use state of various services including the trunk delivery service and the trunk pickup service by the regular user of the vehicle 10A whose use registration has been completed in a form corresponding to the owner user ID (service use state information).

The delivery management server 50 that operates the trunk delivery service (vehicle interior delivery service) and the trunk pickup service (vehicle interior pickup service) includes a communicator 51 and a processor 52.

The communicator 51 is a device to bidirectionally communicate with each of the mobile terminals 20, the center server 30, and the EC server 60 through a predetermined communication network.

The processor 52 includes, for example, a communication processor 521, a service linkage register 522, a delivery receiver 523, and a delivery manager 524, as functional units implemented by executing one or more programs stored in the ROM or the auxiliary storage device on the CPU. The processor 52 also includes a storage 520 implemented as a storage area of an auxiliary storage device or the like of the server computer.

The communication processor 521 controls the communicator 51 to transmit and receive various signals such as control signals and information signals with each of the mobile terminals 20, the center server 30, and the EC server 60.

In response to a service use registration completion notice received from the center server 30 by the communication processor 521, the service linkage register 522 registers information for linkage between the center server 30 and the delivery management server 50 with respect to use of the trunk delivery service and the trunk pickup service used by the regular user of the vehicle 10A.

For example, the service linkage register 522 adds a flag to the service login ID (a part of the service link information) included in the service use registration completion notice in the user management DB that manages users of the delivery sites built in the storage 520, where the flag indicates that the trunk delivery service and the trunk pickup service are to be used. At the same time, the service linkage register 522 registers information identifying the vehicle 10A included in the service link information, and the service login ID on a website (namely, an EC site) corresponding to the EC server 60 included in the use registration completion notice, so as to be associated with the service login ID included in the service use registration completion notice in the user management DB in the storage 520. This enables the delivery management server 50, when the user corresponding to the service login ID regularly uses multiple vehicles 10A, to transmit an authentication key arrangement request to the center server 30 for a vehicle 10A designated by the user. Also, when an order reception including the service login ID has been received from the EC server 60 by the communication processor 521, the delivery management server 50 can identify the service login ID of the corresponding delivery site. Then, the delivery management server 50 transmits to the center server 30 an authentication key arrangement request that includes service link information including the identified service login ID, and information identifying the vehicle 10A corresponding to the vehicle 10A designated by the user, and thereby, can cause the center server 30 to deliver the authentication keys to the mobile terminals 20Ac of the delivery worker and the pickup worker, as will be described later.

Through the communication processor 521, the delivery receiver 523 receives information (item delivery request information) on a delivery request (item delivery request) of a package (item) including the service login ID on the EC site corresponding to the orderer of the item on the EC site or the like from the EC server 60. The item delivery request information received from the EC server 60 includes, for example, basic information such as the name, address, telephone number, and the like of the orderer corresponding to the delivery destination. The item delivery request information also includes, for example, information on a designated delivery destination (delivery destination information), information on delivery date and time (designated delivery date and time) designated by the orderer (client) (designated delivery date and time information). At this time, if the trunk of the vehicle 10A is designated as the delivery destination, the delivery destination information may include information for identifying the vehicle 10A corresponding to the delivery destination such as the identification information on the vehicle 10A (e.g., vehicle ID), information on a designated location to which a delivery worker should go, namely, a designated location where the vehicle 10A is (to be) parked (parking position information) for the delivery of the package (item). The item delivery request information may also include, for example, information on the type (e.g., a predetermined type) of the package (item) to be delivered (item type information).

The delivery receiver 523 also receives information on a return request (item return request) of a package (item) (item return request information), which includes a login ID on an EC site corresponding to the return requester of the item on the EC site from the EC server 60 through the communication processor 521. The item return request information received from the EC server 60 includes, for example, basic information on the return requester such as the name, address, phone number, and the like of the return requester corresponding to the pickup source. The item return request information also includes, for example, basic information on the return destination such as the name (corporate name), address, and telephone number of the return destination (delivery destination). The item return request information further includes, for example, information on a designated pickup source (pickup source information), and in the case where the trunk of the vehicle 10A is designated as the pickup source, information on designated pickup date and time (designated pickup date and time information). At this time, in the case where the trunk of the vehicle 10A is designated as the pickup source, the pickup source information may include information for identifying the vehicle 10A corresponding to the pickup source such as the identification information on the vehicle 10A (e.g., vehicle ID), information on a designated location to which a pickup worker should go, namely, a designated location where the vehicle 10A is (to be) parked (parking position information) at which the package (item) is to be picked up. At this time, in the case where multiple vehicles 10A (typically owned by a return requester or his/her family member) used by the return requester are designated as the pickup sources, the pickup source information may include information on vehicle identification information corresponding to each of the multiple vehicles 10A. This is because when there are multiple items to be returned, depending on the sizes of the items, the items may not be accommodated in one vehicle 10A. The item return request information may also include, for example, information (item type information) on the type (e.g., a predetermined type) of the package (item) to be returned.

The delivery manager 524 operates and manages all processes from request to delivery that are related to an item delivery request corresponding to the trunk delivery service received by the delivery receiver 523.

For example, upon receiving, through the communication processor 521 from a business office that is responsible for a parking position of the vehicle 10A designated as the delivery destination information on an item delivery request, a notice indicating that a package has arrived at the business office, the delivery manager 524 determines departure date and time to deliver the package, and a delivery worker in charge of the package in accordance with the designated delivery date and time (delivery date and hours).

Next, when the departure time of the delivery worker to deliver the target package approaches (e.g., 10 minutes before), the delivery manager 524 makes an inquiry to the center server 30 for positional information on the vehicle 10A through the communication processor 521. Then, the delivery manager 524 obtains the current positional information on the vehicle 10A from the center server 30 through the communication processor 521, and determines whether the delivery is possible, based on whether the current positional information matches the designated parking location of the vehicle 10A, the relationship with the area of responsibility, and the like.

The determination as to whether the delivery is possible may be performed on the center server 30.

Next, having determined that the delivery is possible for the target package, the delivery manager 524 transmits a notice to the mobile terminal 20Ac of the delivery worker through the communication processor 521, which indicates that the package can be delivered to the trunk of the vehicle 10A (deliverable notice).

Next, when the communication processor 521 receives an authentication key obtainment request from the mobile terminal 20Ac that has received the deliverable notice, the delivery manager 524 determines whether or not the authentication key obtainment request is a valid authentication key obtainment request. Specifically, the delivery manager 524 may verify information on the package to be delivered that includes delivery worker, addressee (e.g., the name of the recipient or the corporate name), type of package, designated delivery date and time, delivery place and the like (referred to as "delivery package information" for the sake of convenience, below), which may be included in the authentication key obtainment request, with various information items on the package registered in the storage 520, to perform the determination. Once having determined that the request is a valid authentication key obtainment request, the delivery manager 524 transmits an authentication key arrangement request to the center server 30 through the communication processor 521. At this time, the authentication key arrangement request includes information for identifying the mobile terminal 20Ac of the worker. The information for identifying the worker may be, for example, an authentication ID of the worker for receiving user authentication on the center server 30 in order to use the function of the key application corresponding to the authentication key obtainer 233 and the like of the mobile terminal 20Ac (referred to as a "worker ID" for the sake of convenience, below). This enables the mobile terminal 20Ac of the worker to obtain the authentication key from the center server 30. Also, the authentication key arrangement request includes information for identifying the target package. This also applies to the authentication key arrangement request in the trunk pickup service, which will be described later.

Next, upon receiving through the communication processor 521 an inquiry for the current position of the vehicle 10A from the mobile terminal 20Ac of the delivery worker who has left the business office for the delivery, the delivery manager 524 makes an inquiry to the center server 30 for the current positional information on the vehicle 10A. Then, the delivery manager 524 obtains the current positional information on the vehicle 10A from the center server 30 through the communication processor 521, and transmits (transfers) the current positional information on the vehicle 10A to the mobile terminal 20Ac of the delivery worker. This enables the delivery worker on the way to compare the current positional information on the vehicle 10A with the information on the parking location of the vehicle 10A designated in the delivery destination information, to determine whether to deliver or to take back.

Note that whether to deliver or to take back may be determined on the delivery manager 524 or on the center server 30.

Finally, upon receiving through the communication processor 521 a delivery completion notice from the mobile terminal 20Ac of the delivery worker who has completed the delivery of the package, the delivery manager 524 transmits a notice indicating the delivery completion to the center server 30 through the communication processor 521, with which the operation management related to the trunk delivery service of the package is basically completed. Also, at this time, the delivery manager 524 may transmit a notice indicating that the delivery has been completed to the regular user of the vehicle 10A as the client (the purchaser of the item on the EC site) through e-mail, a predetermined SNS, or an application interoperating with a delivery site, which is installed on the mobile terminals 20Aa and 20Ab.

Note that as described above, after the door (trunk lid, etc.) for accessing the trunk of the vehicle 10A was unlocked and then locked by an unlock request and a lock request from the mobile terminal 20Ac of the delivery worker, the DCM 14 of the vehicle 10A may determine that the delivery by the delivery worker has been completed, to transmit a notice indicating the completion to the center server 30. This enables the center server 30, when the notice is received, to transmit a delivery completion notice to the delivery management server 50. In other words, the center server 30 may transmit a delivery completion notice to the delivery management server 50, in response to receiving a notice from the vehicle 10A indicating that the delivery worker has completed the delivery.

Also, the delivery manager 524 operates and manages all processes from request to delivery that are related to an item return request corresponding to the trunk pickup service received by the delivery receiver 523.

For example, upon receiving an item return request by the delivery receiver 523, the delivery manager 524 determines a pickup worker in charge of the pickup who will depart from a business office that is responsible for the parking location of the vehicle 10A, based on the pickup source information and the designated pickup date and time information in the item return request information.

Next, when the departure time of the pickup worker to pick up the target package approaches (e.g., 10 minutes before), the delivery manager 524 makes an inquiry to the center server 30 for positional information on the vehicle 10A through the communication processor 521. Then, the delivery manager 524 obtains the current positional information on the vehicle 10A from the center server 30 through the communication processor 521, and determines whether the pickup is possible, based on whether the current positional information matches the designated parking location of the vehicle 10A, the relationship with the area of responsibility, and the like.

Note that the determination as to whether the pickup is possible may be performed on the center server 30.

Next, having determined that the pickup is possible for the target package, the delivery manager 524 transmits a notice to the mobile terminal 20Ac of the pickup worker through the communication processor 521, which indicates that the package can be picked up from the trunk of the vehicle 10A (pickable notice).

Next, when the communication processor 521 receives an authentication key obtainment request from the mobile terminal 20Ac that has received the pickable notice, the delivery manager 524 determines whether or not it is a valid authentication key obtainment request. Specifically, the delivery manager 524 may verify information on the package to be picked up that includes pickup worker, sender (e.g., the name of the sender or the corporate name), type of package, designated pickup date and time, pickup place, and the like (referred to as "pickup package information" for the sake of convenience, below), which may be included in the authentication key obtainment request, with various information items on the package registered in the storage 520, to perform the determination. Then, once having determined that it is a valid authentication key obtainment request, the delivery manager 524 transmits an authentication key arrangement request to the center server 30 through the communication processor 521.

Next, upon receiving through the communication processor 521 an inquiry for the current position of the vehicle 10A from the mobile terminal 20Ac of the pickup worker who has left the business office for the pickup, the delivery manager 524 makes an inquiry to the center server 30 for the current positional information of the vehicle 10A. Then, the delivery manager 524 obtains the current positional information on the vehicle 10A from the center server 30 through the communication processor 521, and transmits (transfers) the current positional information on the vehicle 10A to the mobile terminal 20Ac of the pickup worker. This enables the pickup worker on the way to compare the current positional information on the vehicle 10A with the information on the parking location of the vehicle 10A designated in the delivery destination information, to determine whether to perform or cancel the pickup.

Note that whether to perform or cancel the pickup may be determined on the delivery manager 524 or on the center server 30.

Next, upon receiving through the communication processor 521 a pickup completion notice from the mobile terminal 20Ac of the delivery worker who has completed the pickup of the package, the delivery manager 524 transmits a notice indicating the pickup completion to the center server 30 through the communication processor 521. This basically concludes the operation management related to the trunk delivery service of the package. Also, at this time, the delivery manager 524 transmits a notice indicating that the pickup has been completed to the regular user of the vehicle 10A as the requester of the item return through e-mail, a predetermined SNS, or an application interoperating with a delivery site, which may be installed on the mobile terminals 20Aa and 20Ab.

Thereafter, the delivery manager 524 manages operations of the picked-up package while the package is delivered from the business office in charge of pickup to a business office in charge of delivery, and finally delivered to the return destination from the latter business office. Since the contents of operational management are substantially the same as those of general delivery service operations, the description is omitted.

The EC server 60 (an example of an information processing apparatus) includes a communicator 61 and a processor 62.

The communicator 61 is a device to bidirectionally communicate with each of the mobile terminals 20, the center server 30, and the delivery management server 50 through a predetermined communication network.

The processor 62 includes, for example, a communication processor 621, a web resource transmitter 622, a service linkage register 623, and an order reception processor 624, as functional units implemented by executing one or more programs stored in the ROM or the auxiliary storage device on the CPU. The processor 62 also includes a storage 620 implemented as a storage area of an auxiliary storage device or the like of the server computer.

The communication processor 621 controls the communicator 61 to transmit and receive various signals such as control signals and information signals with each of the mobile terminals 20, the center server 30, and the delivery management server 50.

Based on various information items representing resources of EC sites stored in the storage 620, the web resource transmitter 622 transmits resources corresponding to a web page to be displayed to a browser of a terminal including the mobile terminals 20Aa and 20Ab of the user browsing an EC site, to the browser of the terminal in a predetermined way. Web pages that may be displayed on an EC site include the top page of the EC site and a web page (referred to as an "individual item page", below) corresponding to each individual item dealt on the EC site. The web pages that may be displayed on an EC site also include a web page (referred to as a "cart page", below) for displaying a list of items selected (typically, placed in a virtual cart on the EC site) by the user as purchase candidates, and a web page on which the user inputs various information items when ordering individual items (i.e., an order input page). The web pages that may be displayed on an EC site also include a web page for performing a return procedure of an item purchased by the user (i.e., a return item input page). For example, the web resource transmitter 622 concurrently transmits an HTML (Hyper Text Markup Language) document corresponding to a web page, and information in the HTML document such as images and moving images displayed on the web page.

Also, when a predetermined application program installed in a user terminal to interoperate with (link with) an EC site (referred to as an "EC application", below) is activated, the web resource transmitter 622 transmits to the user terminal resources to be displayed on a predetermined window or a screen (collectively referred to as a "window", below) of a display device of the user terminal (e.g., the display 24 of the mobile terminal 20) in a predetermined way. Windows that may be displayed in an EC application include a top window, an individual item window, a cart window, an order input window, and a return item input window, which correspond to the top page of the EC site described above, an individual item page, a cart page, an order input window, and a return item input page, respectively.

For example, under control of the center server 30, the web resource transmitter 622 causes an order input page or a return item input page to display information on the vehicle 10A (referred to as "vehicle-related information", below) for the user to designate the trunk of the vehicle 10A as the delivery destination or the pickup source of an item.

In response to a service use registration completion notice received from the center server 30 by the communication processor 621, the service linkage register 623 registers information for linkage between the center server 30 and the EC server 60 with respect to use of the trunk delivery service by the regular user of the vehicle 10A. For example, the service linkage register 623 adds a flag to the service login ID included in the service use registration completion notice in the user management DB that manages users of the EC site built in the storage 620, where the flag indicates that the trunk delivery service is to be used. At the same time, the service linkage register 623 registers the service login ID included in the service use registration completion notice in the user management DB, to be associated with the service login ID on the website (namely, the delivery site) corresponding to the delivery management server 50 included in the use registration completion notice. This enables the EC server 60, for example, when an inquiry for an order item including the service login ID of the delivery site is received from the delivery management server 50 by the communication processor 621, to identify the service login ID of the corresponding EC site.

The order reception processor 624 receives an order of an item from the user, based on various information inputs on ordering the item input on an EC site accessed by a browser of a terminal of the user (e.g., mobile terminal 20Aa or 20Ab) or through an EC application activated on the user terminal. At this time, if the trunk of the vehicle 10A is selected as the delivery destination on the order input page or the like of the EC site, the order reception processor 624 inquires of the center server 30 for the vehicle use schedule information through the communication processor 621. This enables the order reception processor 624 to obtain the latest vehicle use schedule information through the communication processor 621, and therefore, for example, if the designated delivery date and time overlap another schedule, to take measures such as requesting a change of the delivery date and time. On the other hand, if the vehicle use schedule information on the vehicle 10A corresponding to the designated (selected) delivery destination is compatible with the designated delivery date and time, the order reception processor 624 determines the trunk of the vehicle 10A as the delivery destination.

Also, the order reception processor 624 (an example of a pickup source determiner) receives a return request of a purchased item from the user, based on various information inputs on returning the item input on an EC site accessed by a browser of a terminal of the user (an example of a user terminal) or through an EC application activated on the user terminal. At this time, if the trunk of the vehicle 10A is selected as the pickup source on the return input page or the like of the EC site, the order reception processor 624 inquires of the center server 30 for the vehicle use schedule information through the communication processor 621. At this time, if the trunks of the multiple vehicle 10A are designated (selected) as the pickup sources as described above, the order reception processor 624 inquires of the center server 30 for the vehicle use schedule information for every designated vehicle 10. This enables the order reception processor 624 to obtain the latest vehicle use schedule information through the communication processor 621, and therefore, for example, if the designated pickup date and time overlap another schedule, to take measures such as requesting a change of the pickup date and time. On the other hand, if the vehicle use schedule information on the vehicle 10A corresponding to the designated (selected) pickup source is compatible with the designated pickup date and time, the order reception processor 624 determines the trunk of the vehicle 10A as the pickup source. Also, in the case where the trunks of the multiple vehicles 10A have been designated as the pickup sources of items to be returned, if the schedule is compatible for all of the multiple vehicles 10A as described above, the order reception processor 624 determines the trunks of the multiple vehicles 10A as the pickup sources.

Note that as described above, it is possible to consider a trunk delivery service and a trunk pickup service targeting packages other than ordered items on EC sites. In this case, the delivery management server 50 (an example of an information processing apparatus), or specifically, the delivery receiver 523 (an example of the pickup source determiner) receives a delivery request, based on various information inputs entered, for example, on a delivery site accessed from a browser of a user terminal of the user, or through an application activated on the user terminal to link with the delivery site. Also, the delivery receiver 523 may receive a delivery request, based on various information inputs input by a worker or the like in response to a request from the user, through a terminal for making a delivery request (an example of a user terminal) at a business office or the like of a delivery company which the user visits. At this time, if the trunk of the vehicle 10A is designated as the delivery destination or the pickup source, the delivery receiver 523 may similarly obtain the latest vehicle use schedule information from the center server 30 through the communication processor 521. This enables the delivery management server 50, if the delivery date and time or pickup date and time of a package to/from the trunk of the vehicle 10A designated by the regular user of the vehicle 10A overlap another schedule, to take measures such as requesting a change of the delivery date and time or pickup date and time. On the other hand, if the vehicle use schedule information on the vehicle 10A corresponding to the designated (selected) delivery destination or pickup source is compatible with the designated delivery date and time or pickup date and time, the delivery receiver 523 can similarly determine the trunk of the vehicle 10A as the delivery destination or pickup source. The same applies to a case where multiple vehicles 10A are designated as the pickup sources.

As described above, the processor 32 of the center server 30 that supports the operations of the trunk delivery service (vehicle interior delivery service) and the trunk pickup service (vehicle interior pickup service) includes the communication processor 3201, the condition determiner 3202, the authentication key issuer 3203, the positional information manager 3204, the schedule manager 3205, the registration manager 3206, and the storage 3200. The processor 32 of the center server 30 also includes, for example, a vehicle-related information provider 3208 as a functional unit implemented by executing one or more programs stored in an auxiliary storage device or the like of the server computer on the CPU.

If having received an authentication key arrangement request from the delivery management server 50 through the communication processor 3201, the condition determiner 3202 determines whether or not the request is a valid authentication key arrangement request. For example, the condition determiner 3202 determines whether or not the request is a valid authentication key arrangement request, based on service login information (service login ID on the delivery site, etc.) included in the authentication key arrangement request, and predetermined authentication information (e.g., ID and password) corresponding to the delivery management server 50.

If it has been determined by the condition determiner 3202 that the request is a valid key arrangement request, the authentication key issuer 3203 issues an authentication key corresponding to the authentication key arrangement request, and delivers the authentication key to the mobile terminal 20Ac of the delivery worker or the pickup worker.

Specifically, based on the user service registration information DB in the storage 3200, the authentication key issuer 3203 identifies the vehicle 10A corresponding to the authentication key arrangement request. Also, the authentication key issuer 3203 issues the authorization key with permission limited in time (e.g., usable only for several minutes to several tens of minutes starting from the delivery); limited in the number of usable times (e.g., only once); and limited in functions to be capable of only locking/unlocking the trunk lid. This enables to prevent unauthorized use of the vehicle 10A by the delivery worker or the pickup worker, and to improve the security. The authentication key issuer 3203 delivers the authentication key to the mobile terminal 20Ac of the delivery worker or the pickup worker that is identified by the authentication key arrangement request, through the communication processor 3201.

Note that as a method of limiting the usable period, the number of usable times, and the like of the authentication key, any method may be adopted, such as a known mathematical method or a method based on bidirectional communication between the center server 30 and the vehicle 10.

For example, in response to an inquiry for the current position of the vehicle 10A from the delivery management server 50 received by the communication processor 3201, the positional information manager 3204 obtains the positional information from the vehicle 10A through the communication processor 3201 as described above, to provide (transmit) the obtained information to the delivery management server 50 through the communication processor 3201.

For example, in response to an inquiry from the EC server 60 received by the communication processor 3201, the schedule manager 3205 transmits as a reply to the EC server 60 the latest vehicle use schedule information stored in the storage 3200.

Also, the schedule manager 3205 updates the vehicle use schedule information stored in the storage 3200, in an aspect, for example, to add use of the vehicle 10A related to the trunk delivery service, based on the delivery schedule date and time information included in the delivery request information received from the EC server 60 through the communication processor 3201.

As described above, in response to a user registration request received from the mobile terminal 20Aa of the owner user by the communication processor 3201, the registration manager 3206 registers a regular user (child user) who uses various services including the trunk delivery service. Also, as described above, in response to a service use registration request received from the mobile terminal 20Aa of the owner user by the communication processor 3201, the registration manager 3206 performs use registration of the trunk delivery service by the regular user of the vehicle 10A. Also, as described above, when the use registration of various services including the trunk delivery service is completed, the registration manager 3206 indicates the completion to the mobile terminals 20Aa and 20Ab corresponding to the regular users to be registered, through the communication processor 3201. Also, when the use registration of the trunk delivery service is completed, the registration manager 3206 transmits a service use registration completion notice that includes the service link information to the delivery management server 50 and the EC server 60 that operate and manage the services to be registered, through the communication processor 3201.

The vehicle-related information provider 3208 provides the user (a regular user of the vehicle 10A) with vehicle-related information for designating the trunk of the vehicle 10A as the delivery destination of an item, on an order input window on an EC site or on an order input window of an EC application. In other words, the vehicle-related information provider 3208 causes the order input page of an EC site or the like to display the vehicle-related information for the user to designate the trunk of the vehicle 10A as the delivery destination of the item. At this time, the vehicle-related information provider 3208 can specifically identify the regular user of the vehicle 10A, for example, based on the service login ID of the user browsing the order input page included in the information input from the EC site (EC server 60). In the following, the same applies to the case of a return request.

The vehicle-related information provider 3208 (an example of a controller) also provides the user vehicle-related information for designating the trunk of the vehicle 10A as the pickup source of a return item, on a return input window on an EC site or on a return input window of an EC application. In other words, the vehicle-related information provider 3208 causes the return input page on an EC site or the like to display the vehicle-related information for the user to designate the trunk of the vehicle 10A as the pickup source of the item to be returned.

The vehicle-related information includes, for example, information on the use state of various services of the vehicle 10A, in other words, the vehicle use schedule information that is updated sequentially by the schedule manager 3205. This enables the user, when designating the trunk of the vehicle 10A as the delivery destination or the pickup source of the item on the EC site or the like browsed through the browser of the user terminal, to designate the delivery date and time or pickup date and time among available time slots.

Also, the vehicle-related information may include, for example, positional information on a location at which the vehicle 10A is parked. At this time, the positional information at which the vehicle 10A is parked may be obtained by the positional information manager 3204. This enables the user to understand, on the EC site or the like browsed by the browser on the user terminal, whether or not the trunk of the vehicle 10A can be designated as the delivery destination of the item or the pickup source of the item to be returned, depending on whether the vehicle 10A is within a deliverable or pickable area of items.

Also, the vehicle-related information provided when ordering an item may include, for example, information on the delivery state of packages to the trunk of the vehicle 10A (e.g., a history of packages delivered to the trunk for the last few days). At this time, the information on the delivery state of the packages to the trunk of the vehicle 10A can be obtained, for example, by making an inquiry to the delivery management server 50 through the communication processor 3201. This enables the user to understand, on the EC site or the like browsed by the browser on the user terminal, whether a package that has already been delivered remains in the trunk of the vehicle 10A, and to determine whether the trunk of the vehicle 10A can be designated as the delivery destination of an item.

The vehicle-related information provided when ordering an item may further include, for example, information on the request state of packages with respect to the trunk of the vehicle 10A (e.g., information on the number of packages that have already been requested with the trunk of the vehicle 10A as the delivery destination, and information on individual requested packages). Information on the request state of packages with respect to the trunk of the vehicle 10A may be obtained, for example, by making an inquiry to the delivery management server 50 through the communication processor 3201. This enables the user to determine, on the EC site or the like browsed by the browser of the user terminal, whether the trunk of the vehicle 10A can be designated as the delivery destination of an item, in consideration of the number of items and the like that have already been requested.

The vehicle-related information provided when ordering an item may also include a warning or the like indicating that there is a likelihood that the trunk of the vehicle is full and delivery cannot be performed. In other words, the vehicle-related information provider 3208 may cause the order input page or the like of the EC site to display a warning or the like indicating that there is a likelihood that the trunk of the vehicle 10A is full and delivery cannot be performed when the number of items to be ordered this time, or the number of other items already determined to be delivered, is relatively large. Also, when the number of items to be ordered this time, or the number of other items already determined to be delivered is relatively large, the vehicle-related information provider 3208 may set the trunk of the vehicle 10A unselectable by the user as the delivery destination of an item on the order input page or the like of the EC site. Specifically, when the number of items that the user is ordering on the EC site exceeds a predetermined threshold, the vehicle-related information provider 3208 may display a warning on the order input page on the EC site, or may set the trunk of the vehicle 10A unselectable by the user as the delivery destination of the item. Also, when the number of delivery requests or the delivery amount (delivery capacity) designating the trunk of the vehicle 10A as the delivery destination has already exceeded a predetermined threshold, the vehicle-related information provider 3208 may display a warning on the order input page on the EC site, or may set the trunk of the vehicle 10A unselectable by the user as the delivery destination of the item. At this time, the delivery requests of packages designating the trunk of the vehicle 10A as the delivery destination include all of the delivery requests of packages made by the regular users of the vehicle 10A. Also, the unit of the delivery amount is defined based on the size of a package with which a standard charge for package delivery is defined (e.g., the size defined by the total of the three sides assuming that the package is a rectangular solid). This enables the center server 30 to cause the order input page on the EC site to display a warning based on a simple determination condition in a situation where there is a likelihood that delivery is impossible, so as to urge the requester to change the delivery destination of the item to a place other than the trunk of the vehicle.

In particular, operations of the vehicle-related information provider 3208 related to the trunk pickup service will be described later in detail (see FIGS. 7 and 8).

A part or all of the various functions related to the trunk delivery service and the trunk pickup service of the center server 30 may be transferred to the delivery management server 50 or the EC server 60. For example, the functions of the vehicle-related information provider 3208 may be transferred to the EC server 60. Also, for example, in the case of the trunk delivery service and the trunk pickup service dealing with items other than those on EC sites, the functions of the vehicle-related information provider 3208 may be provided on the delivery management server 50. Also, for example, at least one of the functions of the condition determiner 3202, the authentication key issuer 3203, the positional information manager 3204, the schedule manager 3205, and the registration manager 3206 related to the trunk delivery service and the trunk pickup service may be further transferred to the delivery management server 50.

As described above, the processor 23 of the mobile terminal 20Ac of a worker includes the communication processor 231, the communication processor 232, the authentication key obtainer 233, the authentication requester 234, and the lock/unlock requester 235.

Note that in the embodiment, the following description assumes that the functions of the authentication key obtainer 233, the authentication requester 234, and the lock/unlock requester 235 of the mobile terminal 20Ac become available for a delivery worker or a pickup worker when the key application has been activated.

The authentication key obtainer 233 transmits an authentication key obtainment request to the delivery management server 50 through the communication processor 232 in response to a predetermined operation performed by a worker. At this time, the authentication key obtainment request includes the delivery package information or the pickup package information described above stored in the storage 230 in advance. This enables the delivery management server 50 to transmit an authentication key arrangement request to the center server 30 in response to the authentication key obtaining request, which then enables the center server 30 to deliver the authentication key to the mobile terminal 20Ac in response to the authentication key arrangement request, and thereby, the mobile terminal 20Ac can obtain the authentication key. Therefore, the mobile terminal 20Ac can lock/unlock the trunk lid of the vehicle 10A based on the functions of the communication processor 231, the authentication requester 234, and the lock/unlock requester 235. Therefore, the worker can deliver the requested package to the trunk of the vehicle 10A, or pick up from the trunk of the vehicle 10A, lock the trunk of the vehicle 10A as it was, and return to the office.

[Details of Configuration Related to C2C Car-Sharing Service]

Next, with reference to FIG. 5, a configuration related to the C2C car-sharing service in the authentication key management system 1 will be described.

Figure 5:
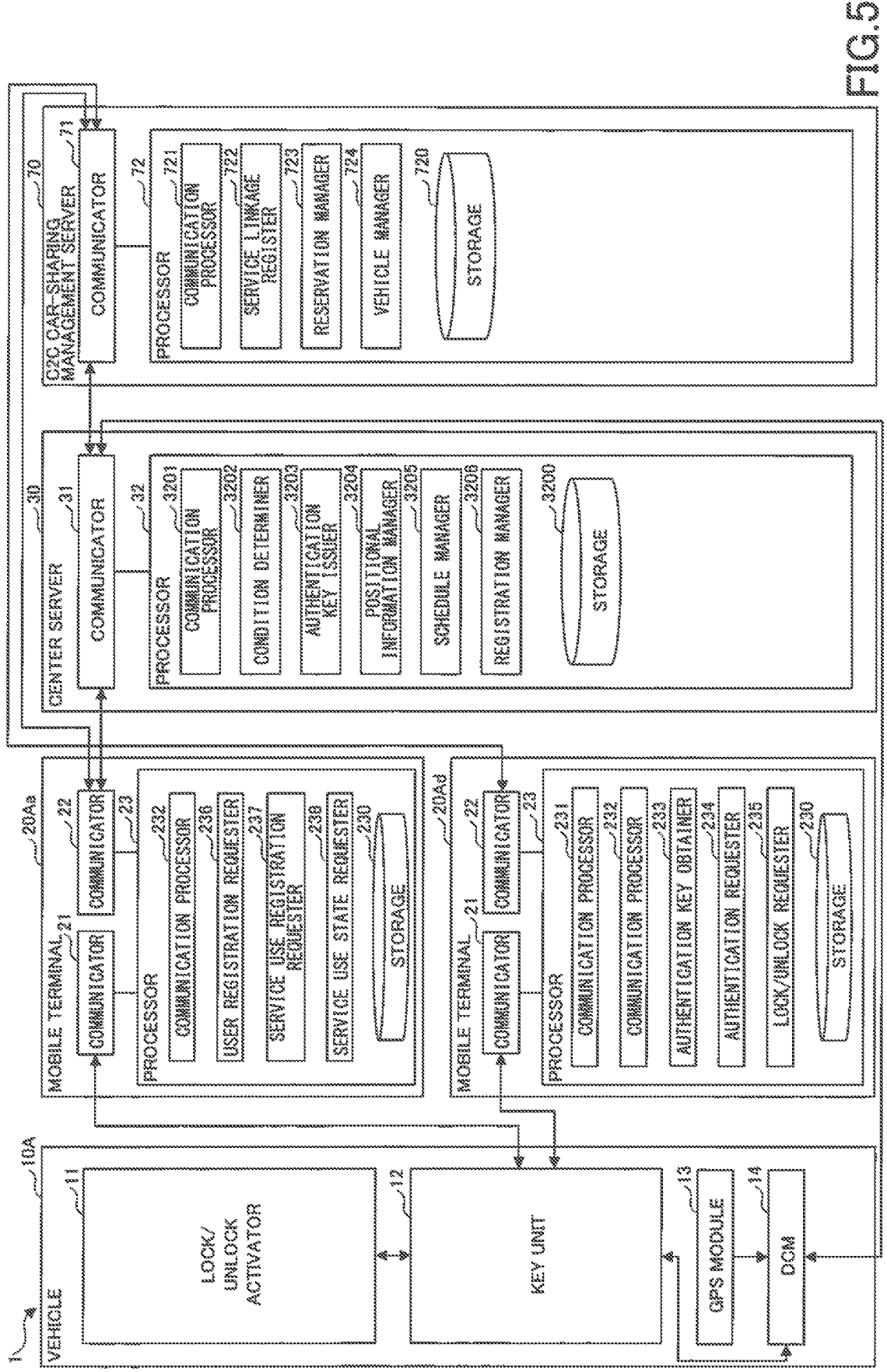
FIG. 5 is a diagram mainly illustrating an example of a configuration related to a C2C car-sharing service in an authentication key management system.

FIG. 5 is a diagram mainly illustrating an example of the configuration related to the C2C car-sharing service in the authentication key management system 1. In the following, referring to FIG. 5, the configuration related to the C2C car-sharing service in the authentication key management system 1 will be mainly described, and duplicate description will be omitted as much as possible for the duplicate elements that have been described with the key-sharing service and the like.

As described above, the processor 23 of the mobile terminal 20Aa carried by the owner user of the vehicle 10A includes the communication processor 232, the user registration requester 236, the service use registration requester 237, and the service use state requester 238.

As described above, the user registration requester 236 requests the center server 30 to register a regular user (child user) of the vehicle 10A who uses various services including the C2C car-sharing service in response to a predetermined operation performed by the owner user.

As described above, the service use registration requester 237 requests the center server 30 to perform use registration of various services including the C2C car-sharing service for a registered regular user (owner user or child user) in response to a predetermined operation performed by the owner user.

For example, the service use registration requester 237 transmits to the center server 30 a service use registration request for using the C2C car-sharing service, which includes the service login ID on a website for users who use the C2C car-sharing service corresponding to the C2C car-sharing management server 70 (referred to as "C2C car-sharing site", below), as the service link information corresponding to the regular user of the vehicle 10A to be registered.

As described above, in response to a predetermined operation performed by the owner user, the service use state requester 238 requests the center server 30 information on the use state of various services including the C2C car-sharing service used by the regular users of the vehicle 10A of which use registration has been completed in a form corresponding to the owner user ID (service use state information).

The C2C car-sharing management server 70 includes a communicator 71 and a processor 72.

The communicator 71 is a device to bidirectionally communicate with each of the mobile terminals 20 and the center server 30 through a predetermined communication network.

The processor 72 includes, for example, a communication processor 721, a service linkage register 722, a reservation manager 723, a reservation manager 723, and a vehicle manager 724, as functional units implemented by executing one or more programs stored in the ROM or the auxiliary storage device on the CPU. The processor 72 also includes a storage 720 implemented as a storage area of an auxiliary storage device or the like of the server computer.

The following description assumes that information identifying the vehicle 10A to be lent has already been stored (registered) in the storage 720 in a form to be associated with the service login ID through the C2C car-sharing site by the regular user (owner user) of the vehicle 10A.

The communication processor 721 controls the communicator 71 to transmit and receive various signals such as control signals and information signals with each of the mobile terminals 20 and the center server 30.

In response to a service use registration completion notice received from the center server 30 by the communication processor 721, the service linkage register 722 registers information for linkage between the center server 30 and the C2C car-sharing management server 70 with respect to use of the C2C car-sharing service by the regular user of the vehicle 10A.

For example, the service linkage register 722 adds a flag to the service login ID included in the service use registration completion notice in the user management DB that manages users of the C2C car-sharing site built in the storage 720, where the flag indicates that the user is the lender of the vehicle 10A in the C2C car-sharing service. This enables the C2C car-sharing management server 70 to transmit to the center server 30 an authentication key arrangement request including the service login ID corresponding to the regular user as the lender of the vehicle 10A, so as to cause the center server 30 to deliver the authentication key to the mobile terminal 20Ad as the borrower, as will be described later.

The reservation manager 723 manages use reservations of the vehicle 10A made through the C2C car-sharing site or the like.

For example, the reservation manager 723 receives a registration of rentable date and time of the vehicle 10A from a regular user of the vehicle 10A through the C2C car-sharing site, and stores (registers) the received rentable date and time in the storage 720. At this time, the reservation manager 723 makes an inquiry to the center server 30 for the vehicle use schedule information through the communication processor 721. This enables the reservation manager 723 to obtain the latest vehicle use schedule information through the communication processor 721. Therefore, for example, when the rentable date and time received from the regular user of the vehicle 10A overlap another schedule, the C2C car-sharing management server 70 can take measures such as requesting the user to change the rentable date and time, or registering an alternative rentable date and time in which the overlapping period is removed from the received rentable date and time.

Also, for example, the reservation manager 723 receives a use reservation of the vehicle 10A within the period of the rentable date and time of the vehicle 10A stored in the storage 720. Then, in response to receiving a use reservation of the vehicle 10A from a user as the borrower through the C2C car-sharing site, the reservation manager 723 updates the information (rental schedule information) on the schedule for lending the vehicle 10A stored in the storage 720.

Also, for example, when an authentication key obtainment request is received from the mobile terminal 20Ad of the borrower of the vehicle 10A by the communication processor 721, the reservation manager 723 determines whether or not the request is a valid authentication key obtainment request. Specifically, the reservation manager 723 may perform the determination based on the service login ID and the password on the C2C car-sharing site, and a relationship with the date and time of the use reservation (e.g., whether it is within the period of the use reservation date and time, whether it is less than a predetermined time before the start date and time, etc.). If the request is a valid authentication key obtainment request, the reservation manager 723 transmits an authentication key arrangement request to the center server 30 through the communication processor 721. At this time, the authentication key arrangement request includes information for identifying the mobile terminal 20Ad of the borrower of the vehicle 10A. The information for identifying the borrower of the vehicle 10A may be, for example, an authentication ID for receiving user authentication on the center server 30 in order for the borrower of the vehicle 10A to use the function of the authentication key obtainer 233 of the mobile terminal 20Ad (referred to as a "borrower ID" for the sake of convenience, below). This enables the mobile terminal 20Ad of the borrower of the vehicle 10A to obtain the authentication key from the center server 30.

The vehicle manager 724 manages vehicles 10A to be lent.

For example, the vehicle manager 724 transmits an inquiry for the current positional information on a vehicle 10A to the center server 30 through the communication processor 721 before the use reservation date and time of the vehicle 10A (e.g., a period from several tens of minutes before to immediately before). Then, the vehicle manager 724 obtains the current positional information on the vehicle 10A returned from the center server 30 in response to the inquiry through the communication processor 721. This enables to determine whether the vehicle 10A will have returned to the designated location before the scheduled rental date and time (date and time of use reservation) of the vehicle 10A. Therefore, if the vehicle 10A has not returned to the designated location, the C2C car-sharing management server 70 can take measures such as warning the regular user as the lender of the vehicle 10A to return to the designated location through an e-mail or a predetermined application interoperating with the C2C car-sharing site installed on the mobile terminals 20Aa and 20Ab.

As described above, the processor 32 of the center server 30 includes the communication processor 3201, the condition determiner 3202, the authentication key issuer 3203, the positional information manager 3204, the schedule manager 3205, the registration manager 3206, and the storage 3200.

If having received an authentication key arrangement request from the C2C car-sharing management server 70 through the communication processor 3201, the condition determiner 3202 determines whether or not it is a valid authentication key arrangement request. For example, the condition determiner 3202 determines whether or not the request is a valid authentication key arrangement request, based on the service link information (service login ID on the C2C car-sharing site, etc.) included in the authentication key arrangement request, and predetermined authentication information (e.g., ID and password) corresponding to the C2C car-sharing management server 70.

If it has been determined by the condition determiner 3202 that the request is a valid key arrangement request, the authentication key issuer 3203 identifies the vehicle 10A corresponding to the authentication key arrangement request based on the user service registration information DB in the storage 3200. Also, the authentication key issuer 3203 issues a time-limited authentication key (e.g., usable only for the use reservation date and time of the vehicle 10A included in the authentication key arrangement request and buffer periods before and after the use reservation date and time). Then, the authentication key issuer 3203 delivers the authentication key to the mobile terminal 20Ad of the borrower of the vehicle 10A identified by the authentication key arrangement request through the communication processor 3201.

Note that the C2C car-sharing service may include, for example, a service in a form of lending only the trunk of the vehicle 10A (referred to as "vehicle trunk rental service" for the sake of convenience, below). In the case of the vehicle trunk rental service, the authentication key issuer 3203 may issue an authentication key with limited permission that only allows to lock/unlock the trunk lid. This enables to limit the target of the C2C car-sharing service to the trunk only. This enables to realize a trunk delivery service in a form in which a user can borrow the trunk of a vehicle 10A at a travel destination, to have a purchased item to be used at the travel destination delivered to the borrowed trunk.

The positional information manager 3204 transmits a positional information request to the vehicle 10A through the communication processor 3201 in response to an inquiry for the current position of the vehicle 10A received from the C2C car-sharing management server 70 by the communication processor 3201. This enables the positional information manager 3204 to obtain the current positional information from the vehicle 10A through the communication processor 3201. Then, the positional information manager 3204 returns the current positional information obtained from the vehicle 10A to the C2C car-sharing management server 70 through the communication processor 3201.

In response to the inquiry for the current position of the vehicle 10A received from the C2C car-sharing management server 70 by the communication processor 3201, the schedule manager 3205 transmits the latest vehicle use schedule information to the vehicle 10A through the communication processor 3201.

As described above, in response to a user registration request received from the mobile terminal 20Aa of the owner user by the communication processor 3201, the registration manager 3206 registers a regular user (child user) who uses various services including the C2C car-sharing service. Also, as described above, in response to a service use registration request received from the mobile terminal 20Aa of the owner user by the communication processor 3201, the registration manager 3206 performs use registration of the C2C car-sharing service by a regular user of the vehicle 10A. Also, as described above, when the use registration of various services including the C2C car-sharing service is completed, the registration manager 3206 indicates the completion to the mobile terminals 20Aa and 20Ab corresponding to the regular users to be registered, through the communication processor 3201. Also, when the use registration of the C2C car-sharing service is completed, the registration manager 3206 transmits a service use registration completion notice including the service link information to the delivery management server that operates and manages the operation of the service to be registered.

As described above, the processor 23 of the mobile terminal 20Ad of the borrower of the vehicle 10A includes the communication processor 231, the communication processor 232, the authentication key obtainer 233, the authentication requester 234, the lock/unlock requester 235, and the storage 230.

The authentication key obtainer 233 transmits an authentication key obtainment request to the C2C car-sharing management server 70 through the communication processor 232 in response to a predetermined operation performed by the borrower of the vehicle 10A. At this time, the authentication key obtainment request includes the service login ID on the C2C car-sharing site corresponding to the borrower of the vehicle 10A. This enables the C2C car-sharing management server 70 to transmit an authentication key arrangement request to the center server 30 in response to the authentication key obtaining request, which then enables the center server 30 to deliver the authentication key to the mobile terminal 20Ad in response to the authentication key arrangement request, and thereby, the mobile terminal 20Ad can obtain the authentication key. Therefore, the mobile terminal 20Ad can lock/unlock the trunk lid of the vehicle 10A based on the functions of the communication processor 231, the authentication requester 234, and the lock/unlock requester 235. In other words, the borrower of the vehicle 10A carrying the mobile terminal 20Ad can directly use the vehicle 10A to lock/unlock the vehicle 10A and to drive the vehicle 10A by using the mobile terminal 20Ad thanks to the C2C car-sharing service, without exchanging the key with a regular user of the vehicle 10A. Similarly, a regular user of the vehicle 10A can lend the vehicle 10A to a person other than the regular users without exchanging the key. Therefore, the C2C car-sharing service in the authentication key management system 1 enables to improve the convenience in lending and borrowing the vehicle 10A between a regular user of the vehicle 10A and another person who is not a regular user.

[Details of Composition Related to B2C Car-Sharing Service]

Next, with reference to FIG. 6, the B2C car-sharing service in the authentication key management system 1 will be described.

Figure 6:
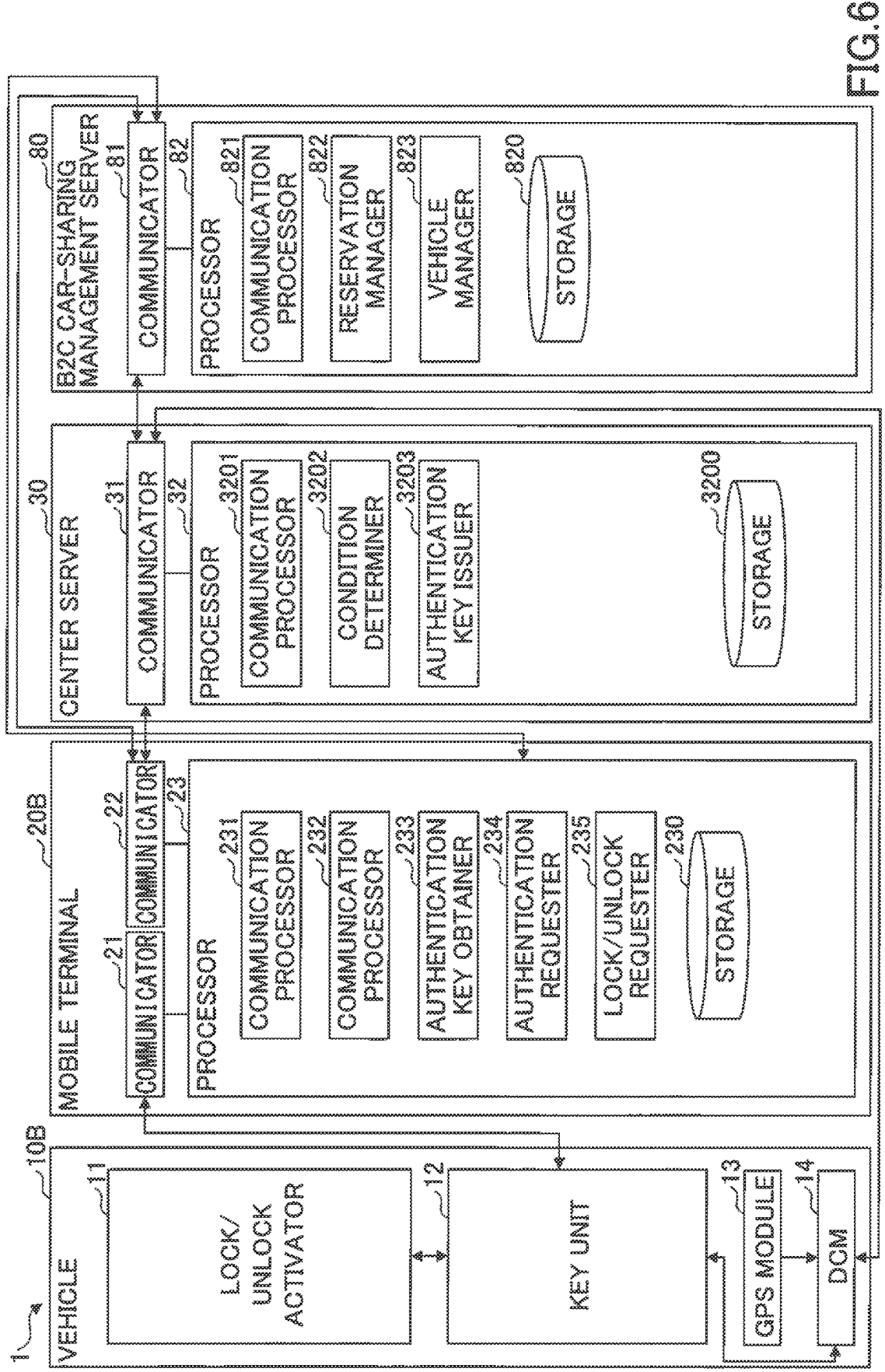
FIG. 6 is a diagram mainly illustrating an example of a configuration related to a B2C car-sharing service in an authentication key management system.

FIG. 6 is a diagram mainly illustrating an example of the configuration related to the B2C car-sharing service in the authentication key management system 1. In the following, referring to FIG. 6, the configuration related to the B2C car-sharing service in the authentication key management system 1 will be mainly described, and duplicate description will be omitted as much as possible for the duplicate elements that have been described with the key-sharing service and the like.

The B2C car-sharing management server 80 includes a communicator 81 and a processor 82.

The communicator 81 is a device to bidirectionally communicate with each of the mobile terminals 20B and the center server 30 through a predetermined communication network.

The processor 82 includes, for example, a communication processor 821, a reservation manager 822, and a vehicle manager 823, as functional units implemented by executing one or more programs stored in the ROM or the auxiliary storage device on the CPU. The processor 82 also includes a storage 820 that is implemented as a storage area such as an auxiliary storage device of the server computer.

The communication processor 821 controls the communicator 81 to transmit and receive various signals such as control signals and information signals with each of the mobile terminals 20B and the center server 30.

The reservation manager 822 manages use reservations of vehicles 10B made through the B2C car-sharing site or the like.

For example, the reservation manager 822 receives a use reservation of a vehicle 10B from a user who desires to borrow the vehicle 10B (referred to as a "borrowing user", below) through a website operated by a company or the like of the B2C car-sharing management server 80. Then, the reservation manager 822 stores the received reservation information (use reservation information) of the vehicle 10B in the storage 820. At this time, the use reservation information includes, for example, information identifying the target vehicle 10B, information on the use reservation date and time (start date and time and end date and time), and the service login ID of the borrowing user on the B2C car-sharing site.

Also, for example, the reservation manager 822 updates information (vehicle use schedule information) related to the use schedule of the vehicle 10B stored in the storage 820, every time the reservation manager 822 receives a use reservation of a vehicle 10B. This enables the B2C car-sharing management server 80 to display the use schedule of the vehicles 10B on the B2C car-sharing site, to present available dates and times for reservation to the borrowing user.

Also, for example, when an authentication key request is received from the mobile terminal 20B by the communication processor 821, the reservation manager 822 determines whether or not the authentication key request is a valid authentication key request. Specifically, the reservation manager 822 may perform the determination based on the service login ID and the password on the B2C car-sharing site corresponding to the borrowing user included in the authentication key request, and a relationship with the date and time of the use reservation (e.g., whether it is within the period of the use reservation date and time, whether it is less than a predetermined time before the start date and time, etc.). If the request is a valid authentication key obtainment request, the reservation manager 822 transmits an authentication key arrangement request to the center server 30 through the communication processor 821. At this time, the authentication key arrangement request includes information for identifying the mobile terminal 20B of the borrowing user who borrows the vehicle 10B. The information for identifying the borrowing user who borrows the vehicle 10B may be, for example, an authentication ID for receiving user authentication on the center server 30 in order for the borrowing user of the vehicle 10B to use the function of the authentication key obtainer 233 of the mobile terminal 20B (referred to as a "borrowing user ID" for the sake of convenience, below). This enables the mobile terminal 20B of the borrowing user who borrows the vehicle 10B to obtain the authentication key from the center server 30.

The vehicle manager 823 manages vehicles 10B to be lent.

For example, the vehicle manager 823 transmits an inquiry to the center server 30 through the communication processor 821 for whether a vehicle 10B is parked around a location designated in the use reservation (e.g., within several hundred meters), before the use reservation date and time of a vehicle 10B specified by a certain borrowing user (e.g., several tens of minutes before). Then, the vehicle manager 823 obtains the positional information on the vehicle 10B parked around the designated location, which is returned from the center server 30 in response to the inquiry through the communication processor 821. This enables the vehicle manager 823 to identify one or more vehicles 10B parked around the designated location before the start date and time of the vehicle 10B to be used by the borrower, and determines which vehicle 10B is to be lent.

Also, for example, in response to a search request of vehicles 10B in an area designated by a borrowing user on the B2C car-sharing site, the vehicle manager 823 transmits an inquiry to the center server 30 for the positional information on the vehicles 10B in the designated area. Then, the vehicle manager 823 obtains the positional information on the vehicles 10B in the designated area, which is returned from the center server 30 in response to the inquiry through the communication processor 821. This enables the vehicle manager 823, for example, to present the positional information on the target vehicles 10B to the borrowing user who desires to borrow a vehicle 10B in the designated area on the B2C car-sharing site.

As described above, the processor 32 of the center server 30 includes the communication processor 3201, the condition determiner 3202, the authentication key issuer 3203, and the storage 3200.

If having received an authentication key arrangement request from the B2C car-sharing management server 80 through the communication processor 3201, the condition determiner 3202 determines whether or not it is a valid authentication key arrangement request. For example, the condition determiner 3202 determines whether or not the request is a valid authentication key arrangement request, based on whether the borrowing user ID included in the authentication key arrangement request is an authentication ID already registered in the storage 3200, and/or predetermined authentication information (e.g., ID and password) corresponding to the B2C car-sharing management server 80.

If it has been determined by the condition determiner 3202 that the request is a valid key arrangement request, the authentication key issuer 3203 issues a time-limited authentication key (e.g., usable only for the use reservation date and time of the vehicle 10B included in the authentication key arrangement request and buffer periods before and after the use reservation date and time). Then, the authentication key issuer 3203 delivers the authentication key to the mobile terminal 20B of the borrowing user who borrows the vehicle 10B identified by the authentication key arrangement request through the communication processor 3201.

As described above, the processor 23 of the mobile terminal 20B of the borrowing user who borrows the vehicle 10B includes the communication processor 231, the communication processor 232, the authentication key obtainer 233, the authentication requester 234, the lock/unlock requester 235, and the storage 230.

The authentication key obtainer 233 transmits an authentication key obtainment request to the B2C car-sharing management server 80 through the communication processor 232 in response to a predetermined operation of a borrowing user who borrows the vehicle 10B. At this time, the authentication key obtainment request includes the service login ID on the B2C car-sharing site corresponding to the borrowing user who borrows the vehicle 10B. This enables the B2C car-sharing management server 80 to transmit an authentication key arrangement request to the center server 30 in response to the authentication key obtaining request, which then enables the center server 30 to transmit an authentication key to the mobile terminal 20B in response to the authentication key arrangement request, and thereby, the mobile terminal 20B can obtain the authentication key. Therefore, the mobile terminal 20B can lock/unlock the door of the vehicle 10B based on the functions of the communication processor 231, the authentication requester 234, and the lock/unlock requester 235. In other words, the borrowing user who borrows the vehicle 10B carrying the mobile terminal 20B can directly use the vehicle 10B to lock/unlock the vehicle 10B and to drive the vehicle 10B, by using the mobile terminal 20B thanks to the B2C car-sharing service, without exchanging the key with a regular user of the vehicle 10B. Therefore, the B2C car-sharing service in the authentication key management system 1 enables to improve the convenience for the borrowing user who borrows the vehicle 10B.

[Characteristic Operations of Center Server]

Next, referring to FIG. 7 and FIG. 8, characteristic operations performed by the center server 30, namely, a process of providing vehicle-related information to a user that is required on a return input page or the like on an EC site, to designate the trunk of the vehicle 10A as the pickup source of an item (package) to be returned (vehicle-related information) will be described.

First, FIG. 7 is a flowchart schematically illustrating an example of a process of providing vehicle-related information performed by the center server 30. The process according to this flowchart is repeatedly executed, for example, at every predetermined processing cycle. This also applies to the flowchart of FIG. 8.

At Step S702, the vehicle-related information provider 3208 determines whether the communication processor 3201 has received from the EC server 60 information representing that a user (a regular user of the vehicle 10A) is making a request for picking up a package on an EC site or the like (pickup intention indicating information). The pickup intention indicating information is transmitted from the EC server 60 to the center server 30, for example, when an item purchased in the past is selected on the EC site or the like in response to an operation on a terminal of the user, and then, transition to the return input page as the access destination is detected. Also, the pickup intention indicating information may include information for identifying the user, for example, the service login ID on the EC site. This enables the vehicle-related information provider 3208 to identify a target vehicle 10A based on the user service registration information DB in the storage 3200 and the service login ID. If having received the pickup intention indicating information from the EC server 60, the vehicle-related information provider 3208 proceeds to Step S704; otherwise, ends the current process.

Note that as described above, it is possible to consider a trunk pickup service targeted for items other than items to be returned on an EC site. In this case, the pickup intention indicating information may be transmitted from the delivery management server 50 to the center server 30 if it is detected that the access destination transitions to a web page for inputting various information items related to a delivery request including a selection of the pickup source in response to an operation on a terminal of the user.

At Step S704, the vehicle-related information provider 3208 obtains the vehicle-related information.

At Step S706, the vehicle-related information provider 3208 transmits a display request to the return input page of the vehicle-related information including the vehicle-related information through the communication processor 3201, and terminates the current process. This enables the EC server 60 to cause the return input page to display the vehicle-related information. Therefore, when making a return request for an item, the user can designate and settle the trunk of the vehicle 10A as the pickup source by using the vehicle-related information. Also, the center server 30 provides the vehicle-related information on the vehicle 10A used by the user to the EC server 60, only when the user has indicated an intention to return an item. Therefore, it is possible for the center server 30 to have a regular user of the vehicle 10A designate the trunk of the vehicle 10A as the pickup source of an item to be returned, while taking care of the privacy of the regular user, as the vehicle-related information may be information concerning the privacy of the regular user.

Next, FIG. 8 is a flowchart schematically illustrating another example of a process of providing vehicle-related information performed by the center server 30.

At Step S802, the vehicle-related information provider 3208 determines whether or not there is a call from an API embedded in a return input page on an EC site or the like accessed by a browser of a terminal of a user. If there has been a call through the API, the vehicle-related information provider 3208 proceeds to Step S804; or if there is no call, the vehicle-related information provider 3208 ends the current process.

At Step S804, the vehicle-related information provider 3208 obtains the vehicle-related information.

At Step S806, the vehicle-related information provider 3208 causes the return input page or the like accessed by the browser of the user terminal of the user through the API, to display the vehicle-related information, and then, ends the current process. This enables the center server 30 to cause the return input page or the like accessed by the browser of the user terminal of the user (e.g., mobile terminals 20Aa and 20Ab, etc.) to directly display the vehicle-related information without transmitting the vehicle-related information to the EC server 60 (EC company). Therefore, the center server 30 can establish a mechanism of a trunk pickup service that takes the privacy of regular users of the vehicle 10A into consideration.

Effects

In the embodiment, in response to a request for picking up a package from a user terminal of a predetermined pickup service, the delivery receiver 523 or the order reception processor 624 determines the interior of a vehicle 10A (i.e., the vehicle interior) used by the user of the pickup service as the pickup source of the package.

This enables the authentication key management system 1 (the delivery management server 50 or the EC server 60) to allow the user to use and designate the interior of the vehicle 10A as the pickup source through a user terminal (e.g., a terminal directly operated by the user, or a terminal for making a request for pickup installed at a business office which the user visits). Therefore, the authentication key management system 1 can establish a pickup service that can use the interior of a vehicle 10A used by a user as a pickup source.

Also, in the embodiment, in response to a request for picking up a package from a user terminal, the delivery receiver 523 or the order reception processor 624 may determine the interiors of multiple vehicles 10A of the user as the pickup sources of multiple items constituting the package.

This enables, considering that multiple items may be included in a single pickup request, the authentication key management system 1 to allow a user to use and designate the interiors of multiple vehicles 10A used by the user as the pickup sources. Therefore, for example, if the user desires to make a request for picking up multiple items constituting the package, the user can designate the interior of the multiple vehicles 10A parked in the same place owned by himself/herself as the pickup sources. Therefore, the authentication key management system 1 can further improve the convenience of the user.

Also, in the embodiment, when information representing an intention of the user related to a pickup request of a package has been received from an external device operating a website related to the pickup service (the delivery management server 50 or the EC server 60) through a website or an application that is installed in the user terminal interoperating with the website, the vehicle-related information provider 3208 transmits information on the vehicle 10A that is required for the user to designate the interior of the vehicle 10A as the pickup source of the package (vehicle-related information) to the user terminal. Then, the delivery receiver 523 or the order reception processor 624 determines the interior of the vehicle 10A as the pickup source of the package if the interior of the vehicle 10A has been designated as the pickup source of the package in response to an operation on the user terminal on which the vehicle-related information on the vehicle 10A is displayed on the website or on a window.

This enables the authentication key management system 1 to specifically cause the website accessed from the user terminal to display the vehicle-related information on the vehicle 10A that can be designated as the pickup source, and to determine the interior of the designated vehicle 10A as the pickup source. Also, the authentication key management system 1 can similarly determine a designated vehicle 10A as the pickup source, by causing a window of an application installed in the user terminal interoperating with the website to display the vehicle-related information on the vehicle 10A that can be designated as the pickup source. Therefore, the authentication key management system 1 can establish a vehicle interior pickup service that can use the interior of the vehicle 10A as a pickup source of a package for which a request is made to be picked up through a predetermined website or an application corresponding to the website.

Also, in the embodiment, when having received information representing an intention of the user to return an item through an EC site or an EC application, the vehicle-related information provider 3208 transmits to the user terminal the vehicle-related information on a vehicle 10A that is required for the user to designate the interior of the vehicle 10A as the pickup source of an item to be returned as the package.

This enables the authentication key management system 1 to specifically establish a vehicle interior pickup service that can use the interior of the vehicle 10A as the pickup source, targeting an item to be returned through an EC site. Also, the authentication key management system 1 can specifically establish a vehicle interior pickup service that can use the interior of the vehicle 10A as the pickup source, targeting an item to be returned through an application that is installed in a user terminal to interoperate with the EC site.

Also, in the embodiment, when information representing an intention of the user as described above has been received from an external device operating a website related to the pickup service (the delivery management server 50 or the EC server 60) through a website or an application, the vehicle-related information provider 3208 causes a predetermined web page of the website or a predetermined window of an application program corresponding to the web page on the user terminal, to display the vehicle-related information on the vehicle 10A.

This enables the authentication key management system 1 to control the vehicle-related information on the vehicle 10A used by the user, which is displayed on the web page of the EC site or the window of the EC application.

Also, in the embodiment, the vehicle-related information provider 3208 may cause a web page or a window displayed on the user terminal to display the vehicle-related information on the vehicle 10A, without having the information go through the external device (the delivery management server 50 or the EC server 60).

Thereby, the authentication key management system 1 does not need to transmit the vehicle information on the vehicle to an external device operating an EC site or the like, in order to cause a web page of the EC site or a window of an EC application to display the vehicle-related information on the vehicle 10A used by the user. Accordingly, the authentication key management system 1 can establish a mechanism of a trunk pickup service that takes privacy of the users into consideration, where the vehicle-related information may include information on privacy of the users, such as the positional information on the vehicle 10A, the use state of the vehicle 10A by another user, and the like.

Also, in the embodiment, the vehicle-related information provider 3208 causes a web page or a window, which is provided for the user to designate or input information on a pickup request, to display the vehicle-related information on the vehicle 10A, through a predetermined API embedded in the web page or the window.

This enables the authentication key management system 1, when such a web page for designating required information on a pickup request is displayed on the user terminal, to cause the web page to display the vehicle-related information on the vehicle 10A, through the predetermined API embedded in the web page. Consequently, the authentication key management system 1 can cause the web page to display the vehicle-related information on the vehicle 10A, without transmitting the vehicle-related information to an external device operating the EC site or the like.

Also, in the embodiment, the authentication key issuer 3203 delivers key information (authentication key) used for unlocking a door to access the interior of the vehicle 10A corresponding to the pickup source determined by the delivery receiver 523 or the order reception processor 624, to a company that provides the pickup service (e.g., the mobile terminal 20Ac of a worker of a delivery company).

This enables the authentication key management system 1 (center server 30) to allow the company that provides the pickup service to obtain the authentication key for unlocking the door to access the interior of the vehicle 10A used by the user, which has been determined as the pickup source. Therefore, the authentication key management system 1 can allow the company to unlock the door to access the interior of the vehicle 10A used by the user, which has been determined as the pickup source, so as to pick up a package.

As above, the embodiments for carrying out the present invention have been described in detail above. Note that the present invention is not limited to such specific embodiments, and various changes and modifications may be made within the scope of the subject matters of the present invention described in the claims.

For example, in the embodiment described above, the mobile terminal 20 transmits an authentication request including an authentication key to the key unit 12, and depending on an authentication result, the key unit 12 exchanges signals with the lock/unlock activator 11, to implement locking/unlocking of the door of the vehicle 10A and activation of the vehicle 10A; however, the embodiment is not limited as such.

Specifically, the functions of the key unit 12 may be transferred to the mobile terminal 20 so that the mobile terminal 20 exchanges signals with the vehicle 10 (lock/unlock activator 11) based on the key information (internal key information) by an LF electric wave and an RF electric wave, to implement locking/unlocking of the door of the vehicle 10A and activation of the vehicle 10A by the lock/unlock activator 11. In this case, the "authentication key" of the embodiment described above may be read as "key information". In other words, the center server 30 may issue the key information instead of the authentication key and deliver it to the mobile terminal 20 in substantially the same way as in the case of the authentication key in the embodiment described above. This brings substantially the same operations and effects as those of the embodiment described above.

Also, the functions of the key unit 12 may be integrated into the lock/unlock activator 11 so as to omit components relevant to communication between the lock/unlock activator 11 and the key unit 12 and components related to authentication based on the communication (LF radio transmitter 111, RF radio wave receiver 112, verification ECU 113, LF radio wave receiver 121, and RF radio transmitter 122). In this case, when the authentication of a mobile terminal 20 based on an authentication key succeeds, instead of the verification ECU 113, the key ECU 124 may directly output an unlock command or a lock command to the body ECU 114 and an activation command to the engine ECU 116, to lock/unlock the door of the vehicle 10 and to activate the vehicle 10. This brings substantially the same operations and effects as those of the embodiment described above.

Also, in the embodiments and the modified examples described above, the target to be locked/unlocked by a transmission signal (authentication signal or the like) transmitted from a mobile terminal is a vehicle; however, the present invention is not limited as such. Specifically, a vehicle in the embodiments and the modified examples described above may be replaced with, for example, a building or a facility used by a user such as a home, a second house, a conference room, or the like.

Specifically, the vehicle interior delivery service or the vehicle interior pickup service may be replaced with a delivery service or pickup service in which the interior of a building (e.g., a home or a privately owned second house) or a facility (e.g., a rental second house, a conference room, etc.) used by the user can be specified as the pickup source. In this case, "the interior of a facility" means a place where intrusion from the outside can be prevented by locking the facility, which includes not only the interior of a building of the facility, but also, for example, the interior of a relatively high wall delimiting the facility where the roof is not provided. Thus, as in the embodiment described above, it is possible to establish a mechanism for designating the interior of a building or a facility used by the user as the delivery destination or the pickup source of a package while taking the privacy of the user into consideration.

Also, the C2C car-sharing service may be replaced with a C2C sharing service that supports lending and borrowing the entirety or some of the rooms of a privately owned home or second house among individuals. This enables to realize sharing the entirety or some of the rooms of a privately owned home or second house among individuals.

Also, the B2C car-sharing service may be replaced with a B2C sharing service that lends facilities owned by companies, organizations, and the like and available to be used by multiple users at different hours (e.g., rental second houses, conference rooms, gymnasiums, etc.). This enables to realize sharing of facilities owned by companies, organizations, and the like that are available for multiple users and at different hours.

The invention claimed is:

1. An information processing system, comprising:
a processor configured to determine the interiors of multiple vehicles parked in the same place and owned by the user and the interiors of adjacent buildings and facilities used by the user as the pickup sources for picking up multiple items constituting a package in response to a request for picking up the package from a user terminal of the pickup service, the processor further configured to validate, prior to issuance of an authentication key that triggers one or more actions associated with the interior of a vehicle of the multiple vehicles, the request based on predetermined authentication information, wherein the authentication key is subject to at least one selected from the group of restricted permission, duration, or usage, and
the system further comprising: an authentication key issuer configured to deliver the authentication key used for unlocking or locking a door to access the interior of the vehicle of the multiple vehicles, a building of the buildings, or a facility of the facilities corresponding to the pickup source determined by the processor, to a mobile terminal of a company that provides the pickup service, wherein the mobile terminal of the company is caused to transmit to a key electronic control unit (ECU) of the vehicle of the multiple vehicles an unlock or lock request including the authentication key and information designating only unlocking or locking the door of the vehicle of the multiple vehicles, if the predetermined authentication key information is determined by the key ECU to match the authentication key delivered with the unlock or lock request, the key ECU is caused to transmit to a body ECU of the vehicle of the multiple vehicles an unlock or lock signal, the body ECU is caused to output a control command to cause a door lock motor of the vehicle of the multiple vehicles to only unlock or lock the door of the vehicle of the multiple vehicles, and the processor determines that the authentication is successful and the door of the vehicle of the multiple vehicles is unlocked or locked.

2. The information processing system as claimed in claim 1, further comprising:
a controller configured to transmit to the use terminal information on the vehicle of the multiple vehicles, the building of the buildings, or the facility of the facilities for the user to designate the interior of the vehicle of the multiple vehicles, the building of the buildings, or the facility of the facilities as the pickup source of the package, in a case where information representing that the user intends to make the request for picking up the package has been received from an external device operating a website related to the pickup service, through the website or an application program installed in the user terminal interoperating with the website,
wherein the processor is configured to determine the interior of the vehicle of the multiple vehicles, the building of the buildings, or the facility of the facilities as the pickup source of the package in a case where the interior of the vehicle of the multiple vehicles, the building of the buildings, or the facility of the facilities has been designated as the pickup source of the package, in response to an operation on the user terminal displaying the information on the vehicle of the multiple vehicles, the building of the buildings, or the facility of the facilities on the website or on a window.

3. The information processing system as claimed in claim 2, wherein the website is a predetermined electronic commerce site, and
wherein the controller transmits to the user terminal the information on the vehicle of the multiple vehicles, the building of the buildings, or the facility of the facilities for the user to designate the interior of the vehicle of the multiple vehicles, the building of the buildings, or the facility of the facilities the pickup source of an item to be returned, in a case where information representing the user's intention to return the item has been received through the electronic commerce site or the application program.

4. The information processing system as claimed in claim 2, wherein in the case where the information representing the user's intention to return the item has been received from the external device through the website or the application program, the controller causes a predetermined web page of the website or a predetermined window of the application program corresponding to the web page displayed on the user terminal, to display the information on the vehicle of the multiple vehicles, the building of the buildings, or the facility of the facilities.

5. The information processing system as claimed in claim 2, wherein the controller causes the web page or the window displayed on the user terminal to display the information on the vehicle of the multiple vehicles, the building of the buildings, or the facility of the facilities, without having the information go through the external device.

6. The information processing system as claimed in claim 5, wherein the controller causes the web page or the window to display the information on the vehicle of the multiple vehicles, the building of the buildings, or the facility of the facilities, through a predetermined API embedded in the web page or the window for the user to designate or input information on the request for picking up the package.

7. An information processing method executed by an information processing apparatus related to a predetermined pickup service, the method comprising:
determining, by a processor, the interiors of multiple vehicles parked in the same place and owned by the user and the interiors of adjacent buildings and facilities used by the user as the pickup sources for picking up multiple items constituting a package in response to a request for picking up the package from a user terminal of the pickup service; and
validating, by the processor and prior to issuance of an authentication key that triggers one or more actions associated with the interior, the request based on predetermined authentication information, wherein the authentication key is subject to at least one selected from the group of restricted permission, duration, or usage
delivering, by the processor, the authentication key used for unlocking or locking a door to access the interior of a vehicle of the multiple vehicles, the building of the buildings, or the facility of the facilities corresponding to the pickup source determined by the processor, to a mobile terminal of a company that provides the pickup service, wherein the mobile terminal of the company is caused to transmit to a key electronic control unit ECU) of the vehicle of the multiple vehicles an unlock or lock request including the authentication key and information designating only unlocking or locking the door of the vehicle of the multiple vehicles, if the predetermined authentication key information is determined by the key ECU to match the authentication key delivered with the unlock or lock request, the key ECU is caused to transmit to a body ECU of the vehicle of the multiple vehicles an unlock or lock signal, the body ECU is caused to output a control command to cause a door lock motor of the vehicle of the multiple vehicles to only unlock or lock the door of the vehicle of the multiple vehicles, and
determining, by the processor, that the authentication is successful and the door of the vehicle of the multiple vehicles is unlocked or locked.

8. A non-transitory computer-readable, recording medium having a program stored therein far causing the information processing apparatus related to the predetermined pickup service, to execute the method as claimed in claim 7.

* * * * *